(12) United States Patent
Schroeder et al.

(10) Patent No.: US 11,198,105 B2
(45) Date of Patent: Dec. 14, 2021

(54) METHOD FOR MANUFACTURING MATERIAL IN THE FORM OF GRANULES THAT CAN BE USED AS ROAD BINDER OR SEALING BINDER AND DEVICE FOR MANUFACTURING SAME

(71) Applicant: TOTAL MARKETING SERVICES, Puteaux (FR)

(72) Inventors: Soenke Schroeder, Itzehoe (DE); Mouhamad Mouazen, Nanterre (FR)

(73) Assignee: TOTAL MARKETING SERVICES, Puteaux (FR)

( * ) Notice: Subject to any disclaimer, the term of this patent is extended or adjusted under 35 U.S.C. 154(b) by 0 days.

(21) Appl. No.: 16/331,879

(22) PCT Filed: Sep. 5, 2017

(86) PCT No.: PCT/FR2017/052346
§ 371 (c)(1),
(2) Date: Mar. 8, 2019

(87) PCT Pub. No.: WO2018/046837
PCT Pub. Date: Mar. 15, 2018

(65) Prior Publication Data
US 2019/0209989 A1    Jul. 11, 2019

(30) Foreign Application Priority Data
Sep. 8, 2016  (FR) ........................................ 1658335

(51) Int. Cl.
*B01J 2/26*      (2006.01)
*B01J 2/20*      (2006.01)
(Continued)

(52) U.S. Cl.
CPC . *B01J 2/26* (2013.01); *B01J 2/20* (2013.01); *B29B 9/10* (2013.01); *C10C 3/14* (2013.01); *B29B 2009/163* (2013.01)

(58) Field of Classification Search
CPC ...... B01J 2/20; B01J 2/26; B29B 9/10; C10C 3/14
See application file for complete search history.

(56) References Cited

U.S. PATENT DOCUMENTS

| 3,026,568 A | 3/1962 | Moar |
| 4,279,579 A | 7/1981 | Froeschke |

(Continued)

FOREIGN PATENT DOCUMENTS

| CN | 203862212 U | * | 10/2014 |
| DK | 2303950 T3 | | 2/2017 |

(Continued)

OTHER PUBLICATIONS

Dec. 19, 2017 Written Opinion of Searching Authority issued in International Patent Application No. PCT/FR2017/052346.

(Continued)

*Primary Examiner* — Timothy Kennedy
(74) *Attorney, Agent, or Firm* — Oliff PLC

(57) ABSTRACT

A method for manufacturing a material in divided form solid at ambient temperature and usable as a road binder or as a sealing binder, such as a road bitumen, a pitch, a stock solution for a bitumen/polymer composition, a clear binder, the method including the implementation of a device intended for granulation having at least two coaxial drums and a horizontal running belt: a fixed inner drum having an orifice and rotating outer drum with orifices, the method including: (i) heating a first composition to a temperature at which it is fluid, (ii) introducing the first composition in the fluid state into the inner drum of the granulation device, (iii)

(Continued)

Figure 1:
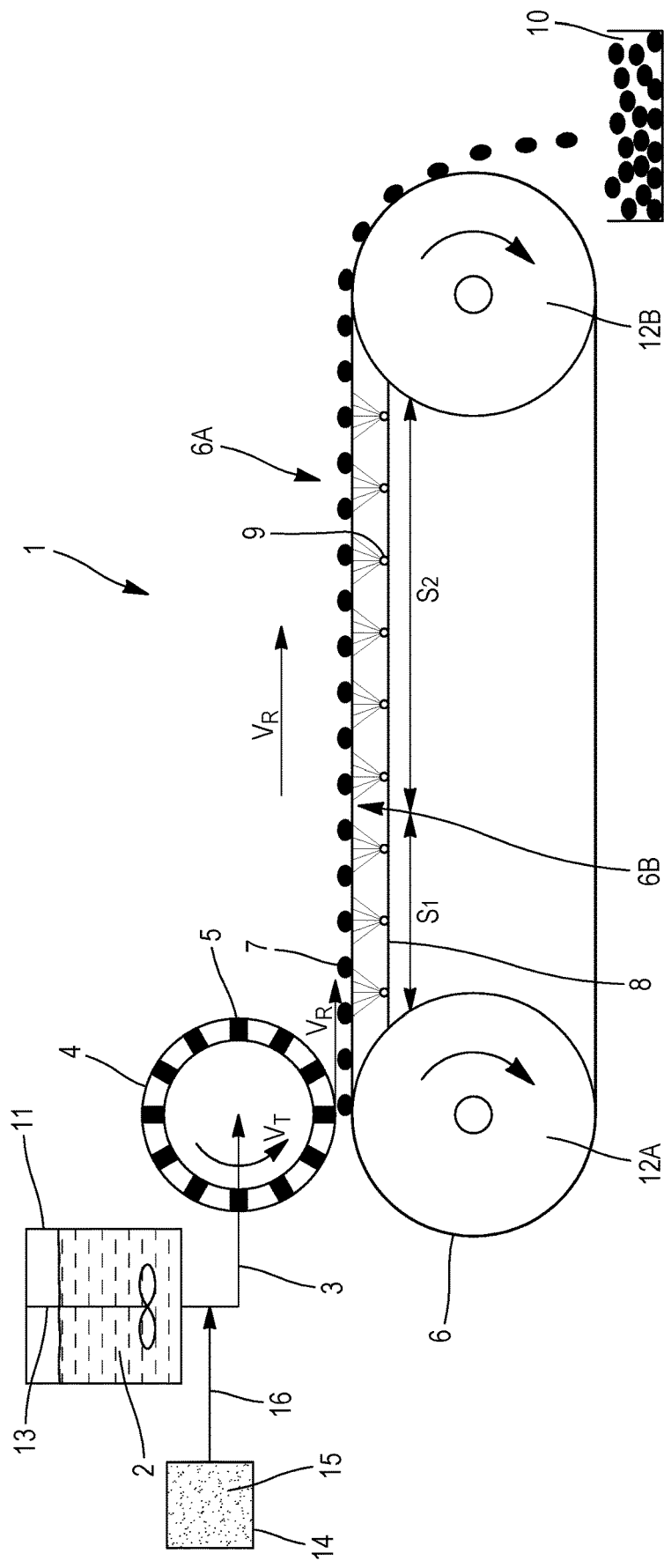

distributing the first composition outwards in drops through the orifices in the rotating outer drum, (iv) depositing the drops on the running belt, and (v) optionally, coating the drops with the second composition. A device for manufacturing these materials.

16 Claims, 2 Drawing Sheets

(51) Int. Cl.
    *B29B 9/10*     (2006.01)
    *C10C 3/14*     (2006.01)
    *B29B 9/16*     (2006.01)

(56) References Cited

U.S. PATENT DOCUMENTS

| | | | |
|---|---|---|---|
| 5,286,181 A * | 2/1994 | Schwager | B01J 2/26 425/8 |
| 5,880,185 A | 3/1999 | Planche et al. | |
| 6,835,756 B2 | 12/2004 | Freide et al. | |
| 2003/0149138 A1 | 8/2003 | Lemoine et al. | |
| 2007/0131578 A1 * | 6/2007 | Ruan | C10C 3/04 208/6 |
| 2011/0009533 A1 * | 1/2011 | Gonzalez Leon | C08K 5/34 524/68 |
| 2011/0185631 A1 | 8/2011 | Subramanian et al. | |
| 2011/0233105 A1 | 9/2011 | Bailey | |
| 2011/0257318 A1 | 10/2011 | Neuville et al. | |
| 2012/0123028 A1 | 5/2012 | Dreesen et al. | |
| 2015/0307713 A1 | 10/2015 | Krafft et al. | |
| 2017/0216802 A1 * | 8/2017 | Siewert | B01J 2/26 |

FOREIGN PATENT DOCUMENTS

| | | |
|---|---|---|
| EP | 0 199 475 A1 | 10/1986 |
| EP | 0 511 197 A1 | 10/1992 |
| EP | 1 473 327 A1 | 11/2004 |
| EP | 1 432 778 B1 | 9/2006 |
| EP | 1 783 174 A1 | 5/2007 |
| FR | 2 765 229 A1 | 12/1998 |
| WO | 2004/020532 A1 | 3/2004 |
| WO | 2007/058994 A2 | 5/2007 |
| WO | 2007/128636 A2 | 11/2007 |
| WO | 2008/022836 A1 | 2/2008 |
| WO | 2008/043635 A1 | 4/2008 |
| WO | 2008/137394 A1 | 11/2008 |
| WO | 2008/141930 A1 | 11/2008 |
| WO | 2008/141932 A1 | 11/2008 |
| WO | 2009/015969 A1 | 2/2009 |
| WO | 2009/071467 A1 | 6/2009 |
| WO | 2009/153324 A1 | 12/2009 |
| WO | 2010/028261 A2 | 3/2010 |
| WO | 2011/000133 A1 | 1/2011 |
| WO | 2016/110747 A1 | 7/2016 |

OTHER PUBLICATIONS

Dec. 19, 2017 Search Report issued in International Patent Application No. PCT/FR2017/052346.

* cited by examiner

METHOD FOR MANUFACTURING MATERIAL IN THE FORM OF GRANULES THAT CAN BE USED AS ROAD BINDER OR SEALING BINDER AND DEVICE FOR MANUFACTURING SAME

The present invention relates to a process for manufacturing a material in divided form, which is solid at ambient temperature, and which can be used as road binder or as sealing binder, such as a road bitumen, a pitch, a stock solution for a bitumen/polymer composition or a clear binder. The material thus obtained has advantageous properties in terms of compression strength and creep resistance during its transportation and/or storage at ambient temperature. The process is economical and applicable on an industrial scale. The invention also relates to a device for manufacturing these materials.

PRIOR ART

Numerous studies have focused on the production of improved forms, easily manipulable divided forms, of materials used for the construction of roadways so as to facilitate their transportation and implementation. Another constraint during the formulation of these materials is that of maintaining their mechanical performance, in particular their resistance to high road stresses and their resistance to aging.

Bitumen is used for the most part in construction, mainly in the manufacture of roadways or in industry, for example for roofing applications. It is generally in the form of a black material that is highly viscous, or even solid, at ambient temperature and which liquefies on heating.

In general, bitumen is stored and transported hot, in bulk, in tank trucks or by boat at high temperatures of the order of 120° C. to 160° C. However, the storage and transportation of hot bitumen presents certain drawbacks. First, the transportation of hot bitumen in liquid form is considered hazardous and is governed by very strict regulations. This mode of transportation does not present any particular difficulties when the transportation equipment and infrastructures are in good condition. When such is not the case, it may become problematic: if the tank truck is not sufficiently thermally insulated, the viscosity of the bitumen may increase during an excessively long journey. Bitumen delivery distances are therefore limited. Secondly, maintaining bitumen at high temperatures in tanks or in tank trucks consumes energy. In addition, maintaining bitumen at high temperatures for a long period may affect the properties of the bitumen and thus change the final performance qualities of the surfacing mix.

To overcome the problems of transporting and storing hot bitumen, conditionings enabling the transportation and storage of bitumens at ambient temperature have been developed. This mode of transporting bitumen in conditioning at ambient temperature represents only a tiny fraction of the amounts transported worldwide, but it meets very real needs for geographical regions that are difficult and expensive to access via conventional transportation means.

Examples of conditioning that may be mentioned include bitumens in the form of pellets transported and/or stored in bags, which are often used in places where the ambient temperature is high. These pellets have the advantage of being easy to handle.

The same difficulty is encountered with pitches and bituminous compositions comprising same, clear binders, bitumen/polymer compositions, especially stock solutions of bitumen/polymer compositions.

U.S. Pat. No. 3,026,568 describes a process for manufacturing bitumen pellets covered with a powdery material, such as limestone powder. The bituminous material is extruded through a nozzle in an atomizing tower. This process can only be performed with mineral powders and in amounts that are incompatible with industrial production. Another drawback lies in the fact that the coating of the pellets can only be performed by dusting.

Patent application WO2009/153324 describes bitumen pellets produced by coextrusion of a bitumen base and of a polymeric anticaking composition, in particular polyethylene.

Patent application US 2011/0233105 describes asphalt which is solid at ambient temperature in the form of pellets comprising a core and a coating layer, these pellets being formed by extrusion through a die.

The drawback of the processes described above is the implementation of an extrusion step which is limiting from the point of view of the yield for industrially producing, and with optimized costs, road bitumen which is in divided form and solid at elevated ambient temperature. In addition, this process is expensive and only allows small production rates.

FR 2 998 896 describes a process for producing pellets of bituminous composition. The pellets are formed by shear-mediated chopping. This process has the drawback of not being able to be applied under economically satisfactory conditions to large amounts of materials.

U.S. Pat. No. 4,279,579 discloses an extrusion device for producing pellets from a molten mass of material. However, said document does not describe the specific use of this equipment for the production of pellets of materials that can be used as road binder or as sealing binder, such as a road bitumen, a pitch, a stock solution for a bitumen/polymer composition or a clear binder. When such a device is used with a composition of this type, it has been observed that, depending on the structure and operating parameters of this device, pellets or an agglomerated mass of particles could be obtained.

US 2011/0185631 discloses a device and a method for preparing asphaltene-rich pellets by extrusion in the form of drops of molten heavy hydrocarbons and then by quenching the drops formed in a cooling medium.

EP 0 511 197 discloses a machine allowing the extrusion of a fluid mass on a mobile support. This machine especially comprises a first immobile cylinder and a second cylinder arranged around the first cylinder and which is capable of rotating around the first cylinder; the fluid mass placed in the first cylinder is extruded through nozzles at the surface of the second cylinder.

WO 2016/110747 describes a process for packaging bitumen in the form of pellets, characterized in that the bitumen is heated and then poured through a perforated rotating cylinder so as to form droplets of hot bitumen which are then cooled on a conveyor belt maintained at a temperature of from 8° C. to 10° C.

FR 2 765 229 discloses clear binders and bituminous binders which can be formed into pellets or granules.

The Applicant thus sought to develop a process for manufacturing pellets of materials that can be used as road binder or as sealing binder, such as a road bitumen, a pitch, a stock solution for a bitumen/polymer composition or a clear binder, especially bitumen pellets, which are capable of being subjected to elevated ambient temperatures without undergoing creep, in particular materials, especially bitumens, in the form of pellets whose adhesion and agglomeration during their transportation and/or storage and/or handling at elevated ambient temperature is reduced relative to the pellets of the prior art. It was sought to develop a process which can be extrapolated to large amounts of material, which is economical and reproducible and which can be performed without difficulty on an industrial scale.

One object of the present invention is to provide a material that can be used as road binder or as sealing binder, such as a road bitumen, a pitch, a stock solution for a bitumen/polymer composition or a clear binder, in particular a road bitumen, which can be transported and/or stored and/or handled at elevated ambient temperature and whose properties are conserved over time.

In particular, the aim of the present invention is to provide a material that can be used as road binder or as sealing binder, such as a road bitumen, a pitch or a stock solution for a bitumen/polymer composition, in particular a road bitumen, which is transportable and/or storable for a period of more than two months, preferably more than three months, and at elevated ambient temperature, especially at a temperature below 100° C., preferably from 20° C. to 80° C.

Another object of the invention is to propose a material that can be used as road binder or as sealing binder, such as a road bitumen, a pitch, a stock solution for a bitumen/polymer composition or a clear binder, in particular a road bitumen, which is easy to handle, especially at elevated ambient temperature, in particular at a temperature ranging up to 100° C., preferably from 20° C. to 80° C.

In particular, the aim of the present invention is to provide a material that can be used as road binder or as sealing binder, such as a road bitumen, a pitch, a stock solution for a bitumen/polymer composition or a clear binder, in particular a road bitumen, which is easy to handle after a prolonged period of transportation and/or storage at elevated ambient temperature, in particular for a transportation and/or storage period of more than 2 months, preferably more than 3 months, and at a temperature ranging up to 100° C., preferably between 20° C. and 80° C.

One object of the present invention is to provide a material that can be used as road binder or as sealing binder, such as a road bitumen, a pitch, a stock solution for a bitumen/polymer composition or a clear binder, in particular a road bitumen, in a form which allows it to flow in solid form at ambient temperature, so as to be able to handle it without any loss of material. It was sought to provide a material that can be used as road binder or as sealing binder, such as a road bitumen, a pitch, a stock solution for a bitumen/polymer composition or a clear binder, in particular a road bitumen, which is in a form allowing it to be packaged in a packaging, to be unpacked, to be transferred into equipment, even at elevated ambient temperature, without the need to heat it, and without any loss of material. The material that may be used as road binder or as sealing binder, such as a road bitumen, a pitch or a stock solution for a bitumen/polymer composition, in particular the bitumen proposed, is in divided and solid form at ambient temperature such that it makes it possible to satisfactorily solve the problems mentioned above.

Another object is to propose an economical industrial process for manufacturing a material that can be used as road binder or as sealing binder, such as a road bitumen, a pitch, a stock solution for a bitumen/polymer composition or a clear binder, in particular road bitumen, which can be transported and/or stored at ambient temperature.

Another object of the invention is to propose an economical industrial process for manufacturing surfacing mixes from road bitumen which can be transported and/or stored at ambient temperature.

Another object of the invention is to propose an economical and ecological process for transporting and/or storing and/or manipulating a material which can be used as road binder or as sealing binder, such as a road bitumen, a pitch, a stock solution for a bitumen/polymer composition or a clear binder, in particular a road bitumen, at ambient temperature, making it possible to avoid the use of additional means for maintaining said material at elevated temperature during transportation and/or storage and/or handling and making it possible to minimize the presence of waste and/or residues.

SUMMARY OF THE INVENTION

The invention relates to a process for manufacturing a material that can be used as road binder or as sealing binder, which is solid at ambient temperature in the form of pellets comprising a core based on a first composition and optionally a coating layer based on a second composition, the first composition comprising at least one material chosen from: a bitumen base, a pitch, a clear binder, this process comprising the use of a device intended for granulation which includes at least two coaxial drums and a horizontal conveyor belt: an immobile internal drum including at least one orifice and a rotating external drum including a plurality of orifices, the drums being placed above one end of the horizontal conveyor belt, driven at a speed $V_R$, this process comprising at least:

(i) the heating of the first composition to a temperature at which it is fluid,
(ii) the introduction of the first composition in fluid form into the internal drum of the granulating device,
(iii) the distribution of the first composition outwards, in the form of drops through orifices in the external rotating drum,
(iv) the deposition of the drops on the conveyor belt, and
(v) optionally, the coating of the drops with the second composition.

According to a preferred embodiment, the process also comprises, after step (iv), between steps (iv) and (v), a step (iv') of cooling the drops of the first composition.

According to a preferred embodiment, the cooling (iv') is performed by means of a temperature gradient on the conveyor belt.

According to an embodiment that is also preferred, the conveyor belt is conditioned at different temperatures over several sections (S1), . . . (Si) of its path, with i being an integer ranging from 2 to 8, preferably from 2 to 4, via thermal conditioning means.

According to a preferred embodiment, the conveyor belt is conditioned at ambient temperature over a first section (S1) of its path, and at a temperature of less than or equal to 20° C., preferentially less than or equal to 15° C., over a second section S2.

According to an embodiment that is also preferred, the ratio of the length of the first section (S1) relative to the length of the second section (S2) ranges from 25/75 to 75/25.

According to a preferred embodiment, the rotating external drum of the device includes orifices with a diameter ranging from 2 to 10 mm, preferably from 2 to 8 mm, preferably from 3 to 7 mm and better still from 3.5 to 6 mm.

According to a preferred embodiment, in step (i), the first composition is brought to a temperature ranging from 100 to 270° C., preferably from 100 to 180° C., preferably from 120 to 160° C. and better still from 130 to 150° C.

According to a preferred embodiment, the speed $V_R$ of the conveyor belt is less than 4 m/min.

According to a preferred embodiment, the process also comprises, after step (v), at least one step (vi) of drying the coated pellets, preferably at a temperature ranging from 20 to 60° C., for a time ranging from 5 minutes to 5 hours, preferably from 5 minutes to 2 hours.

According to a preferred embodiment, the material that may be used as road binder or as sealing binder is chosen from: a bitumen composition, a pitch, a clear binder, a bitumen/polymer stock solution, a clear binder/polymer stock solution.

According to a preferred embodiment, the first composition comprises at least one material chosen from: a bitumen base, a pitch, a clear binder, a bitumen/polymer composition, a clear binder/polymer composition, a bitumen/polymer stock solution; a clear binder/polymer stock solution; a mixture of these materials.

According to a preferred embodiment, the second composition comprises at least one anticaking compound.

According to a preferred embodiment, the anticaking compound is chosen from: talc; fines, generally less than 125 µm in diameter, such as siliceous fines, with the exception of limestone fines; sand, such as Fontainebleau sand; cement; carbon; wood residues, such as lignin, lignosulfonate, conifer needle powders or conifer cone powders, in particular of pine; rice husk ash; glass powder; clays, such as kaolin, bentonite or vermiculite; alumina, such as alumina hydrates; silica; silica derivatives, such as fumed silicas, functionalized fumed silicas, in particular hydrophobic or hydrophilic fumed silicas, pyrogenic silicas, in particular hydrophobic or hydrophilic pyrogenic silicas, silicates, silicon hydroxides and silicon oxides; plastic powder; lime; plaster; rubber crumb; polymer powder, where the polymers are such as styrene/butadiene (SB) copolymers or styrene/butadiene/styrene (SBS) copolymers; and mixtures of these materials.

According to a preferred embodiment, the second composition comprises at least 10% by mass of one or more viscosifying compounds relative to the total mass of the second composition.

According to a preferred embodiment, the viscosifying compound has a dynamic viscosity of greater than or equal to 50 mPa·s$^{-1}$, preferably from 50 mPa·s$^{-1}$ to 550 mPa·s$^{-1}$, more preferentially from 80 mPa·s$^{-1}$ to 450 mPa·s$^{-1}$, the viscosity being a Brookfield viscosity measured at 65° C.

According to a further preferred embodiment, the viscosifying compound is chosen from:
- gelling compounds preferably of plant or animal origin, such as gelatin, agar-agar, alginates, cellulose derivatives, starches, modified starches and gellan gums;
- polyethylene glycols (PEG) such as PEGs with a molecular weight of between 800 g·mol$^{-1}$ and 8000 g·mol$^{-1}$;
- mixtures of such compounds.

According to a preferred embodiment, the second composition comprises from 10% to 90% by mass of one or more anticaking compounds relative to the total mass of the second composition, preferably from 15% to 90% by mass, and from 10% to 90% by mass of at least one viscosifying compound relative to the total mass of the second composition, preferably from 10% to 85% by mass.

According to a preferred embodiment, the second composition consists essentially of one or more anticaking compounds.

According to a preferred embodiment, the bitumen base has a needle penetrability measured at 25° C. according to the standard EN 1426 of from 5 to 330¹/₁₀ mm, preferably from 20 to 220¹/₁₀ mm.

According to a preferred embodiment, the first composition also comprises at least one chemical additive chosen from: an organic compound, a paraffin, a polyphosphoric acid, and mixtures thereof.

According to a preferred embodiment, the first composition comprises:
- from 30% to 40% of at least one polymer,
- from 4% to 6% of at least one compatibilizer,
- from 3% to 15% of at least one anticaking agent, the percentages being on a mass basis relative to the total mass of the first composition.

According to a preferred embodiment, the first composition has a ring and ball softening point (RBSP) of greater than or equal to 90° C., the RBSP being measured according to the standard EN 1427.

According to a preferred embodiment, the first composition has a needle penetrability measured at 25° C. according to the standard EN 1426 of from 5 to 45¹/₁₀ mm.

The invention also relates to the use of the process as described hereinabove and hereinbelow in detail, for manufacturing a composition of material which can be used as road binder or as coating binder, which is solid at ambient temperature and which has stability on transportation and on storage at a temperature ranging from 20 to 80° C. for a period of greater than or equal to 2 months, preferably greater than or equal to 3 months.

The invention also relates to a device that may be used for performing a process as described hereinabove and hereinbelow in detail, which comprises at least: a first cylindrical drum arranged above the conveyor belt and capable of rotating about a longitudinal axis, said first drum comprising a plurality of first passages through the periphery of the drum, a second cylindrical drum coaxial with the first drum, including means for longitudinally introducing into said second drum the mass to be extruded and including on a part of its wall a plurality of second passages directed toward the conveyor belt and aligned radially with said first passages, said wall part being arranged adjacent to said first drum, said first drum being mounted to allow its continuous rotation through 360° about the longitudinal axis relative to said second drum so that the relative rotation between said drums sequentially produces a misalignment and an alignment of the first passages and second passages to allow the fluid mass to move radially outward through the aligned passages, and onto the conveyor belt, this device also comprising:
- a reservoir equipped with heating means and stirring means,
- one or more injection channels, for transferring the composition contained in the reservoir into the second drum through intake means, this device being characterized in that it comprises:
- a reservoir into which may be introduced an additive composition, the reservoir being connected to the injection channel via an injector and allowing injection of the additive composition into the bitumen composition in the injection channel, located downstream of the reservoir and upstream of the twin drum.

FIGURES

FIG. 1: schematic representation of a device 1 according to the invention

Figure 2:
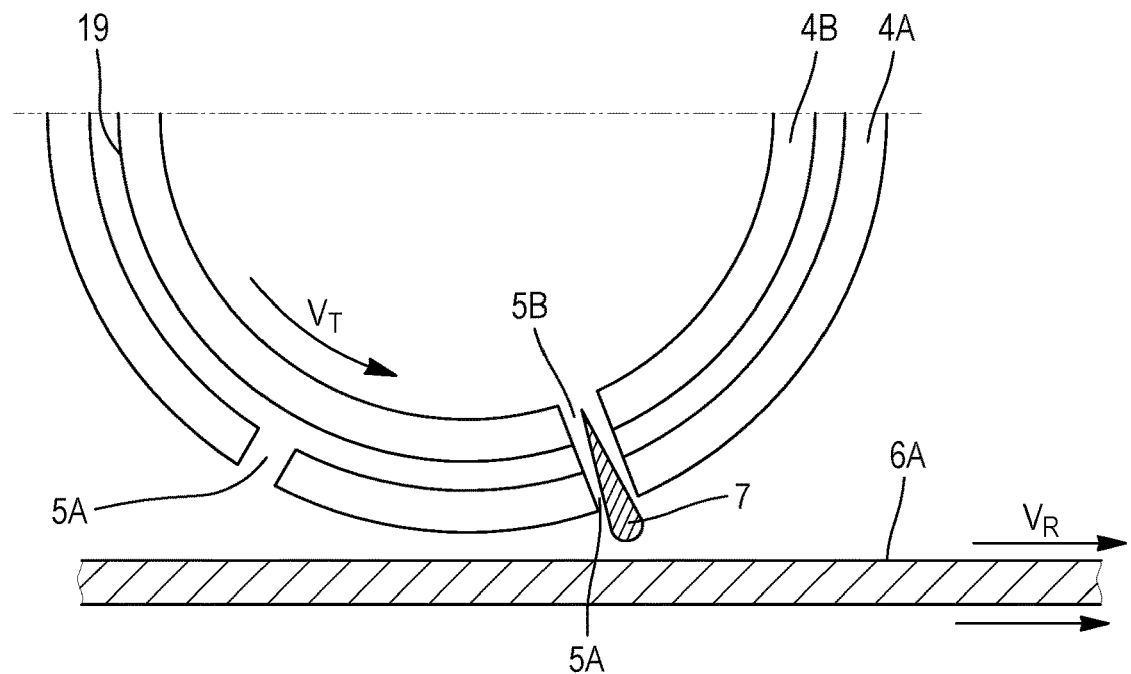
Figure 3:
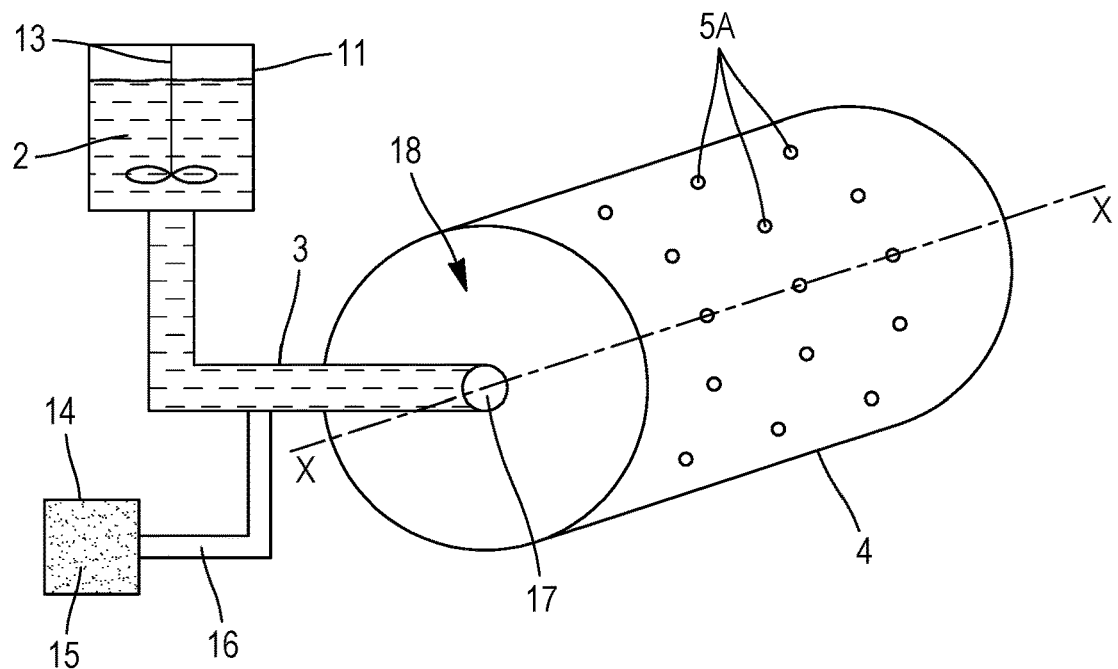

FIG. 2: view in cross section of a part of the functioning of the twin drum 4 in the device 1 of the invention FIG. 3: schematic representation in perspective of the material injection means and reservoirs of a device 1 according to the invention

DETAILED DESCRIPTION

The objectives that the Applicant set itself were achieved by means of the forming of the drops of compositions of material that can be used as road binder or as sealing binder, such as a road bitumen, a pitch, a stock solution for a bitumen/polymer composition or a clear binder, in particular bitumen, using a particular granulating device, this device making it possible to form the core of the core/shell structures, under conditions that are reproducible, extrapolable to a large scale, economical and that give pellets which have improved properties relative to the pellets of these same materials known in the prior art.

The expression "between X and Y" includes the limits. This expression thus means that the targeted range comprises the values X, Y and all the values ranging from X to Y.

The term "ambient temperature" means the temperature resulting from the climatic conditions under which is transported and/or stored the material that can be used as road binder or as sealing binder, in particular road bitumen. More precisely, ambient temperature is equivalent to the temperature reached during the transportation and/or storage of the material that can be used as road binder or as sealing binder, in particular road bitumen, it being understood that the ambient temperature implies that no heat is supplied other than that resulting from the climatic conditions.

The invention relates to materials that can be used as road binder or as sealing binder, in particular bitumens that are liable to be subjected to an elevated ambient temperature, in particular a temperature ranging up to 100° C., preferably from 20° C. to 80° C.

For the purposes of the present invention, the term "material that can be used as road binder or as sealing binder" refers to any material that may be used for this purpose, and especially: bitumen bases, bitumen/polymer compositions, supplemented bitumen compositions, pitches, bitumen-polymer stock solutions, clear binders, clear binder-polymer stock solutions, and mixtures of these materials in all proportions.

The term "material that is solid at ambient temperature" refers to a material which has a solid appearance at ambient temperature irrespective of the transportation and/or storage conditions. More precisely, the term "material that is solid at ambient temperature" means a material which conserves its solid appearance throughout the transportation and/or storage at ambient temperature, i.e. a material which does not undergo creep at ambient temperature under its own weight and, moreover, which does not undergo creep when it is subjected to pressure forces arising from the transportation and/or storage conditions.

The term "bitumen that is solid at ambient temperature" means a bitumen which has a solid appearance at ambient temperature, irrespective of the transportation and/or storage conditions. More precisely, the term "bitumen that is solid at ambient temperature" means a bitumen which conserves its solid appearance throughout the transportation and/or storage at ambient temperature, i.e. a bitumen which does not undergo creep at ambient temperature under its own weight and, moreover, which does not undergo creep when it is subjected to pressure forces arising from the transportation and/or storage conditions.

The term "coating layer covering all or part of the surface of the core" means that the coating layer covers at least 90% of the surface of the core, preferably at least 95% of the surface of the core and more preferentially at least 99% of the surface of the core.

The term "consists essentially of" followed by one or more features means that, besides the components or steps specifically listed, components or steps which do not significantly modify the properties and features of the invention may be included in the process or the material of the invention.

The process according to the invention makes it possible to obtain pellets of material that can be used as road binder or as sealing binder, especially bitumen, which is solid comprising a coating layer which withstands the climatic conditions and the conditions of transportation and/or storage of road binders and/or sealing binders, in particular which withstands the climatic conditions and the conditions of transportation and/or storage of solid road bitumen, and which breaks easily under a mechanical shear effect, for instance under the effect of mechanical shear applied in a tank such as a mixer or a mixing drum during the manufacture of surfacing mixes.

More particularly, the coating layer withstands the transportation and/or storage of road binders and/or sealing binders, in particular bitumen, at ambient temperature in "big bags" while at the same time being brittle under the effect of mechanical shear. It thus allows the release of the bitumen core during the manufacture of surfacing mixes.

The Process:

The process of the invention is performed using a device which is shown in FIGS. 1 to 3 and which is illustrated by the production of a bitumen composition. However, the process may be performed, with simple parameter adaptations, on other compositions such as pitches, clear binders, stock solutions or mixtures of such compositions in all proportions.

Part of the device as described in FIG. 1 is described in great detail in patent U.S. Pat. No. 4,279,579. Various models of this device are commercially available from the company Sandvik under the trade name Rotoform. This device 1 comprises a reservoir 11 equipped with heating means (not shown) and with stirring means 13, making it possible to bring the contents of the reservoir 11, a bitumen composition 2, to the fluid state. Depending on the additives that may be present in the bitumen base, the first composition 2 is brought to a temperature chosen to avoid degradation of said additives. One or more injection channels 3 make it possible to transfer the fluid bitumen composition 2 into the pelletizing twin drum 4. As is described in patent U.S. Pat. No. 4,279,579, the injection of the bitumen composition 2 into the pelletizing twin drum 4 takes place, as shown in FIG. 3, through the intake means 17 placed at a side end 18 of the drum 4. In an innovative manner, the device of the invention also comprises a reservoir 14 in which is placed an additive composition 15. This reservoir 14 is connected to the injection channel 3 via an injector 16 and allows injection of the additive composition 15 into the bitumen composition 2 in the channel 3, located downstream of the reservoir 11 and upstream of the twin drum 4. Specifically, certain additives become degraded when they are stored hot in a bitumen composition and their introduction into the reservoir 11 would lead to their destruction before the bitumen composition 2 has reached the pelletizing twin drum 4. Other additives decant on storage and lead to the formation of an inhomogeneous composition. Thus, the presence of an additive reservoir 14 equipped with an injector 16 emerging into the injection channel 3 makes it possible to overcome these difficulties and to introduce into the pelletizing drum 4 a bitumen composition 2, the composition of which is sufficiently stable over time and sufficiently homogeneous to form the pellets of the desired composition. The pelletizing drum 4 comprises an immobile internal drum or stator 4B equipped with heating means (not shown) for keeping the optionally supplemented composition 2 in the fluid state. It includes a rotating external drum 4A, the two drums being equipped with slits, nozzles and orifices for pelletizing bitumen drops 7 through the first immobile drum and orifices 5 of the rotating external drum. For example, as shown in FIG. 2, the first immobile drum 4B may comprise a longitudinal slit 5B and the second rotating drum 4A includes regularly aligned orifices 5A of substantially identical size, as illustrated in patent U.S. Pat. No. 4,279,579. Other arrangements of the orifices of the two drums are possible. Under the effect of the substantially homogeneous internal pressure inside the twin drum 4 of the device 1, when the orifices 5B and 5A of the two drums are facing each other, the drops 7 are regularly pelletized through said orifices 5 and thus have substantially homogeneous sizes. The bitumen drops 7 are deposited on the upper face 6A of a horizontal conveyor belt 6, driven by the rollers 12A and 12B, and one end of which is placed under the twin drum 4. The dimensions of the orifices 5 of the rotating external drum make it possible to control the size of the bitumen drops 7. For example, the orifices 5A may consist of substantially circular orifices 4 mm in diameter. The tangential speed $V_T$ of the twin drum 4 is parallel to the conveyor belt 6 and in the same direction as the speed $V_R$ of the conveyor belt 6. The speed $V_R$ of the conveyor belt 6 is adapted to allow a regular deposition of drops 7 at a sufficient distance from each other to avoid agglomeration or coalescence of the drops 7. $V_R$ and $V_T$ are substantially identical. For example, a speed $V_T$=3 m/minute gives satisfactory results. The conveyor belt 6 is equipped with a first thermal conditioning device 8 on a first section S1 of its length and with a second thermal conditioning device 9 on a second section S2 of its length. The conditioning allows gradual cooling and solidification of the bitumen drops 7. The thermal conditioning means may consist of nozzles 8, 9 for vaporizing a fluid, such as water, onto the lower face 6B of the conveyor belt 6, at a chosen temperature. For example, section S1 over a length of 5 m conditions the conveyor belt 6 at ambient temperature (22-28° C.), and section S2, also over a length of 5 m, cools the conveyor belt to 20° C. or to 15° C. According to one variant, the conveyor belt 6 may be equipped with a larger number (for example 3, 4, 5 or 6) successive thermal conditioning devices so as to control the temperature of the conveyor belt 6, section by section, more finely. The conveyor belt 6 may have any suitable dimensions so as to allow the deposition and gradual cooling of the bitumen drops 7. For example, the conveyor belt 6 may have a length of 10 m and a width of 60 cm. The dimensions of the conveyor belt 6 are adapted especially as a function of the dimensions of the twin drum 4 (in particular the width of the twin drum 4), of the amounts of material to be treated and of the desired temperature gradient. At the opposite end of the conveyor belt to the twin drum 4, the bitumen drops 7 are transferred to receiving means 10 which may consist, for example, of a storage device, such as "big bags", a coating device, or a second conveyor belt for transferring them to processing equipment such as equipment for coating the bitumen drops 7. Preferably, the bitumen drops 7 are transferred to a coating device (not shown) such as a device for coating by dipping, by spraying or any other suitable device, as a function of the chosen coating composition.

The bitumen drops 7 are prepared from a first composition comprising at least one material chosen from: a bitumen base, a pitch, a clear binder, mixtures thereof. Preferably, said first composition comprises at least one or more bitumen bases. The process of the invention may comprise, after the step of depositing the drops 7 on the conveyor belt 6 and before an optional coating step, a step (iv') of cooling the drops 7 of the first composition 2. This cooling may be performed by any means known to those skilled in the art, such as storing at a low temperature, blowing with cold air, etc.

The process of the invention also optionally comprises the coating of the drops with the second composition. This coating may optionally be followed by drying of the coated pellets at a temperature ranging from 20 to 60° C., for a period ranging from 5 minutes to 5 hours, preferably from 5 minutes to 2 hours.

Preferably, during the implementation of the process of the invention, the mass ratio of the coating composition (second composition) relative to the mass of the first composition comprising the bitumen base, which is optionally supplemented, forming the core is from 0.1 to 1, advantageously from 0.2 to 0.9.

According to a first embodiment of the invention, the coating composition, or second composition, comprises one or more anticaking compounds.

According to a second embodiment of the invention, the coating composition, or second composition, comprises at least one viscosifying compound and at least one anticaking compound.

The viscosifying compound and the anticaking compound are as described below.

These various coatings may be used irrespective of the chemical nature of the first composition; they are particularly suited to bitumen compositions. Where appropriate, a person skilled in the art knows how to adapt the second coating composition as a function of the nature of the first composition to produce an optimized result.

The Pellets:

According to the invention, the material that can be used as road binder or as sealing binder, especially bitumen, which is solid at ambient temperature is packaged in a divided form, i.e. in the form of small-sized units, referred to as pellets or particles, including a core based on bitumen or pitch or clear binder, or a mixture of these components (first composition) and optionally an envelope or shell or covering or coating layer or coating (second composition).

Preferably, the pellets of material that can be used as road binder or as sealing binder, especially solid bitumen, according to the invention may have, within the same population of pellets, one or more shapes chosen from a cylindrical, spherical or ovoid shape. The size of the pellets is such that the longest mean dimension is preferably from 2 to 10 mm, preferably from 2 to 8 mm, preferably from 3 to 7 mm, better still from 3.5 to 6 mm. The size of the pellets may vary according to the dimensions of the orifices of the rotating drum used. Generally, all the orifices of the rotating drum are of substantially identical dimensions; however, it may be envisaged to vary these dimensions.

Preferably, the pellets of material that can be used as road binder or as sealing binder, especially bitumen, according to the invention have a weight of between 0.1 g and 50 g, preferably between 0.2 g and 10 g and more preferentially between 0.2 g and 5 g.

First Variant:

According to a first variant, the pellets of material that can be used as road binder or as sealing binder are prepared from a first bitumen composition comprising one or more bitumen bases.

Preferably, the bitumen pellets are prepared from a first bitumen composition comprising:
one or more bitumen bases,
from 0.1% to 5% by mass, preferably from 0.5% to 4% by mass, more preferentially from 0.5% to 2.8% by mass and even more preferentially from 0.5% to 2.5% by mass of at least one chemical additive,
the percentages being on a mass basis relative to the total mass of the bitumen base.

The bitumen base and the chemical additive are as described below.

Preferably, the bitumen pellets are prepared from a first bitumen composition comprising:
one or more bitumen bases,
from 0.1% to 5% by mass, preferably from 0.5% to 4% by mass, more preferentially from 0.5% to 2.8% by mass and even more preferentially from 0.5% to 2.5% by mass of at least one chemical additive, and
from 0.5% to 20% by mass, preferably from 2% to 20% by mass, more preferentially from 4% to 15% by mass of at least one anticaking agent,
the percentages being on a mass basis relative to the total mass of the bitumen base.

According to another preferred embodiment, the pellets are prepared from a first composition comprising:
one or more bitumen bases,
between 0.1% and 5% by mass, preferably between 0.5% and 4% by mass, more preferentially between 0.5% and 2.8% by mass and even more preferentially between 0.5% and 2.5% by mass of at least one chemical additive,
and between 0.05% and 15% by mass, preferably between 0.1% and 10% by mass, more preferentially between 0.5% and 6% by mass of at least one olefinic polymer adjuvant,
the percentages being on a mass basis relative to the total mass of the bitumen base.

According to another preferred embodiment, the pellets are prepared from a first composition comprising:
one or more bitumen bases,
from 30% to 40% of at least one polymer,
from 4% to 6% of at least one compatibilizer,
from 3% to 15% of at least one anticaking agent,
the percentages being on a mass basis relative to the total mass of the first composition.

Optionally, the bitumen pellets are prepared from a first road bitumen composition and covered with a second composition comprising at least one anticaking agent. This type of pellet has a core/shell structure, also known as a core/coating layer.

According to this embodiment, the pellets comprise, or better still are essentially composed of:
a core prepared from a first composition,
a coating layer prepared from a second composition comprising at least one anticaking compound.

The bitumen pellets are covered with the anticaking agent according to any known process, for example according to the process described in U.S. Pat. No. 3,026,568.

According to a third embodiment, the bitumen pellets are prepared from a first road bitumen composition and covered with a second composition comprising at least one anticaking agent and at least one viscosifying agent. According to this embodiment, the pellets comprise, or better still are essentially composed of:
a core prepared from a first composition,
a coating layer prepared from a second composition comprising at least one viscosifying compound and at least one anticaking compound.

The various coating layers may be combined with all the variants of the first compositions.

According to one embodiment of the invention, the solid bitumen pellets may also comprise one or more other coating layers, based on anticaking agent covering all or part of the coating layer of the solid bitumen according to the invention.

Advantageously, the various embodiments described above for the pellets may be combined together.

Second Variant:

According to a second variant, the pellets of material that can be used as road binder or as sealing binder are prepared from a first composition comprising at least one pitch.

According to a first embodiment, the pellets consist of a first composition based on pitch.

According to a second embodiment, the pellets consist of a first composition based on pitch and on at least one bitumen base.

According to a first embodiment of this second variant, the first composition comprises at least one pitch having a penetrability at 25° C. ranging from 0 to 20 1/10 mm and a ring and ball softening point (RBSP) ranging from 115° C. to 175° C., it being understood that the penetrability is measured according to the standard EN 1426 and that the RBSP is measured according to the standard EN 1427.

According to a second embodiment of this second variant, the first composition comprises:
at least one pitch having a penetrability at 25° C. ranging from 0 to 20 1/10 mm and a ring and ball softening point (RBSP) ranging from 115° C. to 175° C., it being understood that the penetrability is measured according to the standard EN 1426 and that the RBSP is measured according to the standard EN 1427,
at least one bitumen base, and
at least one chemical additive chosen from an organic compound, a paraffin, a polyphosphoric acid, and mixtures thereof.

Preferably, according to this second embodiment, the first composition comprises:
at least one pitch having a penetrability at 25° C. ranging from 0 to 20 1/10 mm and a ring and ball softening point (RBSP) ranging from 115° C. to 175° C., it being understood that the penetrability is measured according to the standard EN 1426 and that the RBSP is measured according to the standard EN 1427,
at least one bitumen base, and
from 0.1% to 5% by mass, preferably from 0.5% to 4% by mass, more preferentially from 0.5% to 2.8% by mass and even more preferentially from 0.5% to 2.5% by mass of at least one chemical additive chosen from an organic compound, a paraffin, a polyphosphoric acid, and mixtures thereof,
the percentages being on a mass basis relative to the total mass of the first composition.

According to a first variant of this second embodiment, the first composition comprises:
at least one pitch having a penetrability at 25° C. ranging from 0 to 20 1/10 mm and a ring and ball softening point (RBSP) ranging from 115° C. to 175° C., it being understood that the penetrability is measured according to the standard EN 1426 and that the RBSP is measured according to the standard EN 1427, at least one bitumen base, from 0.1% to 5% by mass, preferably from 0.5% to 4% by mass, more preferentially from 0.5% to 2.8% by mass and even more preferentially from 0.5% to 2.5% by mass of at least one chemical additive chosen from an organic compound, a paraffin, a polyphosphoric acid, and mixtures thereof, and from 0.5% to 20% by mass, preferably from 2% to 20% by mass, more preferentially from 4% to 15% by mass of at least one anticaking agent, the percentages being on a mass basis relative to the total mass of the first composition.

According to a second variant of this second embodiment, the first composition comprises:

at least one pitch having a penetrability at 25° C. ranging from 0 to 20 1/10 mm and a ring and ball softening point (RBSP) ranging from 115° C. to 175° C., it being understood that the penetrability is measured according to the standard EN 1426 and that the RBSP is measured according to the standard EN 1427, at least one bitumen base, from 0.1% to 5% by mass, preferably from 0.5% to 4% by mass, more preferentially from 0.5% to 2.8% by mass and even more preferentially from 0.5% to 2.5% by mass, or even from 0.5% to 2.8% by mass, of at least one chemical additive chosen from an organic compound, a paraffin, a polyphosphoric acid, and mixtures thereof, and from 0.05% to 15% by mass, preferably from 0.1% to 10% by mass and more preferentially from 0.5% to 6% by mass of at least one olefinic polymer adjuvant, the percentages being on a mass basis relative to the total mass of the first composition.

Advantageously, the invention relates to pitch pellets covered over at least part of their surface with an anticaking agent as defined below, preferably over all of their surface.

Preferably, the mass of the anticaking agent covering at least part of the surface of the pitch pellets is between 0.2% and 10% by mass, preferably between 0.5% and 8% by mass, more preferentially between 0.5% and 5% relative to the total mass of the pitch.

Advantageously, the mass of the anticaking agent covering at least part of the surface of the pitch pellets is about 1% by mass relative to the total mass of the pitch.

Preferably, the anticaking layer covering the pitch pellets according to the invention is continuous so that at least 90% of the surface of said pellets is covered with an anticaking agent, preferably at least 95%, more preferentially at least 99%.

Third Variant:

According to a third variant, the pellets of material that can be used as road binder or as sealing binder are prepared from a first composition comprising at least one clear binder.

Conventional bituminous binders, due to the presence of asphaltenes, are black in color and are therefore difficult to color. Colored coatings are increasingly used because they make it possible, inter alia, to improve the safety of road users by clearly identifying the specific lanes such as pedestrian lanes, bicycle lanes and bus lanes. They also make it possible to materialize certain danger zones such as entrances to urban areas or dangerous bends. Colored coatings promote visibility in low light conditions, for example at night or in particular sites such as tunnels. Finally, they quite simply improve the esthetic appearance of urban roads and can be used for public squares, courtyards and school yards, sidewalks, pedestrian streets, garden and park paths, parking areas and rest areas.

Consequently, for all the abovementioned applications, it is preferred to use synthetic clear binders, which do not contain asphaltenes and which can be colored.

According to this variant, the first composition comprises at least one clear binder.

Advantageously, the first composition comprises at least one clear binder base and at least one chemical additive chosen from an organic compound, a paraffin, a polyphosphoric acid, and mixtures thereof.

According to one embodiment of the invention, the first composition comprises from 0.1% to 5% by mass, preferably from 0.5% to 4% by mass, more preferentially from 0.5% to 2.8% by mass and even more preferentially from 0.5% to 2.5% by mass of said chemical additive relative to the total mass of said supplemented clear binder.

According to one embodiment of the invention, the first composition comprises at least one clear binder base, between 5% and 30% by mass, preferably between 6% and 28% by mass and more preferentially between 7% and 26% by mass of the chemical additive(s) relative to the total mass of said clear binder base.

In this case, the first composition is said to be a concentrated clear binder.

According to a preferred embodiment, the pellets are prepared from a first composition comprising:

one or more clear binder bases, from 30% to 40% of at least one polymer, from 4% to 6% of at least one compatibilizer, from 3% to 15% of at least one anticaking agent, the percentages being on a mass basis relative to the total mass of the first composition.

The expression "clear binder that is solid under cold conditions and in divided form" means a clear binder which is solid at ambient temperature and which is packaged in a divided form, i.e. in the form of units which are distinct from one another, referred to as pellets.

The clear binder according to the invention is denoted without difference in the present description "clear binder that is solid under cold conditions and in divided form" or "supplemented clear binder".

Preferably, the clear binder is a composition that can be used as a substitute for bitumen-based binders for the preparation, for example, of a colored bituminous surfacing mix. A clear binder is free of asphaltenes and can therefore keep the natural color of the aggregate with which it is mixed or can be easily colored with pigments.

As for the pellets whose first composition comprises a bitumen base, the pellets prepared from a first composition comprising at least one clear binder may be coated with a coating layer prepared from:

a second composition comprising at least one anticaking compound, or a second composition comprising at least one viscosifying compound and at least one anticaking compound.

The Bitumen Base

Advantageously, the nucleus or core of the solid bitumen pellets according to the invention is prepared from a first composition, which is a road bitumen composition, said first composition being prepared by placing in contact:

one or more bitumen bases, and optionally at least one chemical additive.

For the purposes of the invention, the terms "bitumen" and "road bitumen" are used equivalently and independently of each other. The term "bitumen" or "road bitumen" means any bituminous composition constituted by one or more bitumen bases and optionally comprising one or more chemical additives, said compositions being intended for a road application.

Among the bitumen bases that may be used according to the invention, mention may be made first of bitumens of natural origin, those contained in deposits of natural bitumen, of natural asphalt or bituminous sands and bitumens originating from the refining of crude oil. The bitumen bases according to the invention are advantageously chosen from bitumen bases originating from the refining of crude oil. The bitumen bases may be chosen from bitumen bases or mixtures of bitumen bases originating from the refining of crude oil, in particular bitumen bases containing asphaltenes or pitches. The bitumen bases may be obtained via conventional processes for manufacturing bitumen bases at a refinery, in particular by direct distillation and/or vacuum distillation of oil. These bitumen bases may optionally be viscosity-reduced and/or de-asphalted and/or air-rectified. It is common practice to perform vacuum distillation on the atmospheric residues originating from the atmospheric distillation of crude oil. This manufacturing process consequently corresponds to the sequence of atmospheric distillation and vacuum distillation, the feedstock feeding the vacuum distillation corresponding to the atmospheric residues. These vacuum residues derived from the vacuum distillation tower may also be used as bitumens. It is also common practice to inject air into a feedstock usually composed of distillates and of heavy products originating from the vacuum distillation of atmospheric residues originating from oil distillation. This process makes it possible to obtain a blown or semi-blown or air-oxidized or air-rectified or partially air-rectified base.

The various bitumen bases obtained via the refining processes may be combined together to obtain the best technical compromise. The bitumen base may also be a recycled bitumen base. The bitumen bases may be bitumen bases of hard grade or of soft grade.

According to the invention, for the conventional processes for manufacturing bitumen bases, the process is performed at manufacturing temperatures of between 100° C. and 270° C., preferably between 100° C. and 200° C., preferably between 140° C. and 200° C., more preferentially between 140° C. and 170° C., and with stirring for a time of at least 10 minutes, preferably between 30 minutes and 10 hours, more preferentially between 1 hour and 6 hours. The term "manufacturing temperature" means the temperature of heating of the bitumen base(s) before mixing and also the mixing temperature. The heating time and temperature vary according to the amount of bitumen used and are defined by the standard NF EN 12594.

According to the invention, blown bitumens may be manufactured in a blowing unit, by passing a stream of air and/or oxygen through a starting bituminous base. This operation may be performed in the presence of an oxidation catalyst, for example phosphoric acid. The blowing is generally performed at high temperatures, of the order of 200 to 300° C., for relatively long times typically between 30 minutes and 2 hours, continuously or in batches. The blowing time and temperature are adjusted as a function of the properties targeted for the blown bitumen and as a function of the quality of the starting bitumen.

Preferentially, the bitumen base used for manufacturing the pellets of the invention has a needle penetrability measured at 25° C. according to the standard EN 1426 of from 5 to 330 1/10 mm, preferably from 20 to 220 1/10 mm.

In a known manner, the "needle penetrability" measurement is performed by means of an NF EN 1426 standardized test at 25° C. ($P_{25}$). This penetrability characteristic is expressed in tenths of a millimeter (dmm or 1/10 mm). The needle penetrability, measured at 25° C. according to the standardized test NF EN 1426, represents the measurement of the penetration into a bitumen sample, after a time of 5 seconds, of a needle whose weight with its support is 100 g. The standard NF EN 1426 replaces the ratified standard NF T 66-004 of December 1986 with effect from Dec. 20, 1999 (decision of the General Director of AFNOR dated Nov. 20, 1999).

The Clear Binder Base

The term "clear binder base" means compositions comprising a plasticizer, for example an oil of petroleum origin or of plant origin, a structuring agent, for example a hydrocarbon-based resin, and a polymer. The composition of the clear binder bases determines certain essential properties of these binders, in particular the plasticity index, the viscosity of the binder, or the color which must be as clear as possible.

According to one embodiment of the invention, the clear binder base comprises:
  a plasticizer, for example a natural or synthetic oil, free of asphaltenes,
  a structuring agent, for example a hydrocarbon-based or plant resin,
  a copolymer,
  where appropriate, doping agents, or dopants, or adhesion dopants.

Clear binder compositions are described in the following patents and patent applications and these clear binder compositions may be used as clear binder base in the present invention.

A clear binder comprising hydrogenated white oils comprising at least 60% of paraffinic carbons (according to the ASTM D2140 method), and a hydrocarbon-based resin, where appropriate mixed with ethylene-vinyl acetate (EVA) copolymers or low-density polyethylene, for example of the EPDM (ethylene-propylene-diene-monomer) type, as described in WO 01/53409, may be used as clear binder base.

A clear binder comprising an oil with a naphthenic content between 35% and 80% and a hydrocarbon-based resin, as described in EP 1783174, may be used as clear binder base.

A clear binder comprising a synthetic oil, a resin and an SBS or SIS type polymer, as described in EP 1473327, may be used as clear binder base.

As clear binder base, use may be made of a clear binder comprising:
  at least one oil of petroleum origin, preferably an aromatic oil comprising aromatic extracts of petroleum residues, obtained by extraction or dearomatization of residues from distillations of petroleum fractions,
  at least one resin of plant origin, preferably chosen from rosin esters, esters of glycerol and rosins, esters of pentaerythritol and rosins, taken alone or as a mixture, and
  at least one latex, preferably chosen from acrylic polymer latices, natural rubber latices and synthetic rubber latices, taken alone or as a mixture, as described in WO 2009/150519.

As clear binder base, use may be made of a synthetic clear binder comprising:
  at least one oil of plant origin, preferably chosen from rapeseed, sunflower, soybean, linseed, olive, palm, castor, wood, maize, marrow, grape seed, jojoba, sesame, walnut, hazelnut, almond, shea, macadamia, cottonseed, alfalfa, rye, safflower, groundnut, coconut and coconut kernel oils, and mixtures thereof, at least one resin of petroleum origin, preferably chosen from hydrocarbon-based resins of petroleum origin resulting from the copolymerization of aromatic, aliphatic, cyclopentadienic petroleum fractions taken alone or as a mixture, and at least one polymer, preferably chosen from styrene/butadiene copolymers, styrene/isoprene copolymers, ethylene/propene/diene terpolymers, polychloroprenes, ethylene/vinyl acetate copolymers, ethylene/methyl acrylate copolymers, ethylene/butyl acrylate copolymers, ethylene/methyl acrylate/glycidyl methacrylate terpolymers, ethylene/butyl acrylate/maleic anhydride terpolymers and atactic polypropylenes, taken alone or as mixtures, the amount of plant oil in the binder being greater than or equal to 10% by mass and the amount of polymer in the binder being less than or equal to 15% by mass, as described in WO 2010/055491.

According to another embodiment of the invention, the clear binder base comprises:

(i) a plasticizer consisting of an oil with a total content of paraffinic compounds, measured according to the ASTM D2140 method, of at least 50%, preferably at least 60% by weight, more preferentially of between 50% and 90%, preferably between 60% and 80%, and (ii) a copolymer based on conjugated diene units and monovinyl aromatic hydrocarbon units, for example based on butadiene units and styrene units.

Preferably, the oil is a synthetic oil derived from deasphalting unit fractions (or "DAO oil").

Preferably, the oil has a total content of paraffinic compounds greater than or equal to 50%, preferably greater than or equal to 60% by weight, and a total content of naphthenic compounds of less than or equal to 25% by weight, measured according to the ASTM D2140 method.

Preferably, the oil has a total content of paraffinic compounds greater than or equal to 50%, preferably greater than or equal to 60% by weight, a total content of naphthenic compounds of less than or equal to 25% by weight, and a total content of aromatic compounds of less than or equal to 25% by weight, measured according to the ASTM D2140 method.

For example, the oil has a total content of paraffinic compounds, measured according to the ASTM D2140 method, of between 50% and 90%, preferably between 60% and 80% by weight, a total content of naphthenic compounds of between 5% and 25% by weight, and a total content of aromatic compounds of between 5% and 25% by weight.

Preferably, the oil has an aniline point, measured according to the standard ISO2977: 1997, of greater than or equal to 80° C., preferably greater than or equal to 90° C., for example greater than 100° C.

Preferably, the clear binder base preferably comprises (i) from 40% to 80% by weight of plasticizer, (ii) from 20% to 50% by weight of resin, (iii) from 1% to 7% by weight of copolymer; and (iv) optionally from 0.05% to 0.5% by weight of adhesion dopant, for example of amine, relative to the weight of clear binder base.

Advantageously, the clear binder base preferably comprises (i) from 40% to 80% by weight of plasticizer, (ii) from 20% to 50% by weight of resin, (iii) from 1% to 7% by weight of copolymer, and (iv) from 0.05% to 0.5% by weight of adhesion dopant, for example of amine, relative to the weight of clear binder base.

Advantageously, the clear binder base also comprises (i) from 45% to 70% by weight of plasticizer, (ii) from 25% to 50% by weight of resin, (iii) from 1% to 7% by weight of copolymer; and (iv) optionally from 0.1% and 0.3% by weight of adhesion dopant, relative to the total weight of clear binder base.

Preferably, the clear binder base consists essentially of (i) from 40% to 80% by weight of plasticizer, (ii) from 20% to 50% by weight of resin, (iii) from 1% to 7% by weight of copolymer, relative to the total weight of clear binder base.

Advantageously, the clear binder base essentially consists of (i) from 40% to 80% by weight of plasticizer, (ii) from 20% to 50% by weight of resin, (iii) from 1% to 7% by weight of copolymer and (iv) from 0.05% to 0.5% by weight of adhesion dopant, relative to the total weight of the clear binder base.

Advantageously, the clear binder base essentially also consists of (i) from 45% to 70% by weight of plasticizer, (ii) from 25% to 50% by weight of resin (iii) from 1% to 7% by weight of copolymer; and (iv) from 0.1% to 0.3% by weight of adhesion dopant, relative to the total weight of clear binder base.

Preferably, the copolymer is a copolymer based on styrene and butadiene units which comprises a weight content of 1,2-butadiene ranging from 5% to 70%.

Preferably, the copolymer is advantageously a copolymer based on styrene and butadiene units which comprises a weight content of 1,2-butadiene ranging from 5% to 70% and a weight content of 1,2-vinyl groups of between 10% and 40%.

For example, said copolymer based on styrene and butadiene units has a mass-average molecular mass of between 10 000 and 500 000, preferably between 50 000 and 200 000 and more preferentially between 50 000 and 150 000 daltons. Preferably, a styrene/butadiene block copolymer or styrene/butadiene/styrene block copolymer will be used.

The clear binders according to the invention are advantageously characterized in that they have a color index of less than or equal to 4, preferably less than or equal to 3, as determined according to the ASTM DH4 scale.

In addition, they may advantageously have a ring and ball softening point, determined according to the standard NF EN1427, of between 55° C. and 90° C.

Preferably, the clear binder that may be used according to the invention has a penetrability at 25° C., measured according to the standard NF EN 1426, of between 10 and 220¹⁄₁₀ mm, preferably between 30 and 100¹⁄₁₀ mm and more preferentially between 40 and 80¹⁄₁₀ mm. A person skilled in the art can modulate the penetrability of the clear binder that may be used in the invention in particular by judiciously choosing the [structuring agent/plasticizer] weight ratio in the composition of the clear binder base. Specifically, it is known that an increase in this ratio makes it possible to reduce the penetrability at 25° C.

The clear binder bases used in the invention may be prepared, for example, according to the following process comprising the steps of:

(i) mixing the plasticizer, for example the DAO oil, and heating at a temperature of between 140 and 200° C., for example for from 10 minutes to 30 minutes, (ii) adding the structuring agent, for example the hydrocarbon-based resin, mixing and heating at a temperature of between 140 and 200° C., for example for from 30 minutes to 2 hours, (iii) adding the polymer(s), for example SBS, mixing and heating at a temperature of between 140 and 200° C., for example for from 90 minutes to 3 hours, preferably from 90 minutes to 2 hours 30 minutes, (iv) optionally adding an adhesion dopant, mixing and heating at a temperature of between 140 and 200° C., for example for from 5 minutes to 20 minutes.

The order of steps (i) to (iv) may be modified.

According to one embodiment of the invention, the clear binder pellets also comprise at least one coloring agent as described above, for instance a pigment.

In these embodiments, the anticaking agent and/or the coloring agent will be chosen by a person skilled in the art depending on the color of the desired clear binder.

The Pitch

According to the dictionary, the term "pitch" means a residue from the distillation of tars from oil, from oil from coal, from wood or from other organic molecules.

The invention relates herein to the residues from the distillation of oil, also known as "petroleum pitch".

For the purposes of the invention, use will be made, independently of each other, of the terms "pitch", "petroleum pitch" and "deasphalting pitch".

The pitches may be obtained via conventional manufacturing processes in a refinery. The manufacturing process corresponds to the sequence of atmospheric distillation and vacuum distillation. In a first stage, crude oil is subjected to distillation at atmospheric pressure, which leads to the production of a gaseous phase, of various distillates and of an atmospheric distillate residue. The residue from the atmospheric distillation is then itself subjected to a distillation under reduced pressure, known as vacuum distillation, which makes it possible to separate a heavy gas oil, various distillate fractions and a vacuum distillation residue. This vacuum distillation residue contains "petroleum pitch" in variable concentration.

It is possible to obtain "petroleum pitch" according to two processes:

1st Process:

The vacuum distillation residue is subjected to a deasphalting operation by addition of an appropriate solvent, such as propane, which thus makes it possible to precipitate the pitch and to separate it from the light fractions, such as the deasphalted oil.

2nd Process:

The vacuum distillation residue is subjected to solvent extraction, more specifically with furfural. This heterocyclic aldehyde has the distinguishing feature of selectively dissolving aromatic and polycyclic compounds. This process thus makes it possible to remove the aromatic extracts and to recover the "petroleum pitch".

According to one embodiment, the pitch is an oxidized pitch.

Preferably, the oxidized pitch according to the invention is obtained by oxidation of a mixture comprising pitch and a diluent, such as a light gasoline, also known as "flux", subjected to an oxidation operation in a blowing tower in the presence of a catalyst, at a fixed temperature and at a given pressure.

For example, oxidized pitches may be manufactured in a blowing unit by passing a stream of air and/or oxygen through a starting pitch. This operation may be performed in the presence of an oxidation catalyst, for example phosphoric acid. The oxidation is generally performed at high temperatures, of the order of 200 to 300° C., for relatively long periods typically between 30 minutes and 2 hours, continuously or in batches. The oxidation time and temperature are adjusted as a function of the properties targeted for the oxidized pitch and as a function of the quality of the starting pitch.

The mechanical qualities of the pitches are generally evaluated by determining a series of mechanical features via standardized tests, the most widely used of which are the needle penetrability expressed in $1/10$ mm and the softening point determined by the ring and ball test, also known as the ring and ball softening point (RBSP).

According to one embodiment of the invention, the pitch has a needle penetrability at 25° C. of from 0 to $20^{1}/_{10}$ mm, preferably from 0 to $15^{1}/_{10}$ mm, more preferentially from 0 to $10^{1}/_{10}$ mm, it being understood that the penetrability is measured according to the standard EN 1426.

According to one embodiment of the invention, the pitch has a softening point of between 115° C. and 175° C. Among examples of pitches used in the invention, there are pitches respectively having a softening point of between 115° C. and 125° C., between 135° C. and 145° C. or between 165° C. and 175° C.

The Plasticizer

For the purposes of the invention, the term "plasticizer" means a chemical constituent for fluidizing and reducing the viscosity and the modulus of the binder obtained.

In one embodiment of the invention, the plasticizer is chosen from oils of petroleum origin, oils of plant origin and a mixture thereof.

In one preferred embodiment of the invention, the oils of plant origin are chosen from rapeseed, sunflower, soybean, linseed, olive, palm, castor, wood, maize, marrow, grapeseed, jojoba, sesame, walnut, hazelnut, almond, shea, macadamia, cottonseed, alfalfa, rye, safflower, groundnut, coconut and coconut kernel oils, and mixtures thereof.

Preferably, the oils of plant origin are chosen from rapeseed, sunflower, linseed, coconut and soybean oils, and mixtures thereof.

In a preferred embodiment of the invention, the oils of petroleum origin are chosen from aromatic oils and oils of synthetic origin.

Preferably, the aromatic oils comprise aromatic extracts of petroleum residues, obtained by extraction or dearomatization of residues from distillations of petroleum fractions.

More preferentially, the aromatic oils have a content of aromatic compounds of between 30% and 95% by weight, advantageously between 50% and 90% by weight, more advantageously between 60% and 85% by weight (SARA: Saturates/Aromatics/Resins/Asphaltenes method).

More preferentially, the aromatic oils have a content of saturated compounds of between 1% and 20% by weight, advantageously of between 3% and 15% by weight, more advantageously of between 5% and 10% by weight (SARA: Saturates/Aromatics/Resins/Asphaltenes method).

More preferentially, the aromatic oils have a content of resin-based compounds of between 1% and 10% by weight, advantageously of between 3% and 5% by weight (SARA: Saturates/Aromatics/Resins/Asphaltenes method).

In a preferred embodiment of the invention, the oils of synthetic origin result from deasphalting fractions from distillation under reduced pressure (vacuum residue VR) of crude oil (hereinafter denoted "DAO oil").

In particular, in a preferred embodiment, the plasticizer consists solely of a DAO oil.

The contents of paraffinic, naphthenic and aromatic compounds mentioned in the present patent application are determined according to the standard ASTM D2140, as weight percentages relative to the weight of the oil.

In a specific embodiment, the plasticizer is an oil, for example a DAO oil, having a total content of paraffinic compounds of at least 50% by weight, preferably of at least 60% by weight, for example of between 50% and 90%, preferably between 60% and 90%, more preferentially between 50% and 80% and in particular of between 55% and 70% or in particular of between 60% and 75%.

In a more specific embodiment, the plasticizer is an oil, for example a DAO oil, also having a total content of naphthenic compounds which does not exceed 25%, for example between 5% and 25% and in particular between 10% and 25%.

In a more specific embodiment, the plasticizer is an oil, for example a DAO oil, also having a total content of aromatic compounds which does not exceed 25%, for example between 5% and 25% and in particular between 8% and 18%.

In a particularly preferred embodiment, the plasticizer is an oil, for example a DAO oil, comprising the respective contents:
 (i) a total content of paraffinic compounds of between 50% and 90%;
 (ii) a total content of naphthenic compounds of between 5% and 25%, for example between 15% and 25%; and
 (iii) a total content of aromatic compounds of between 5% and 25%, for example between 10% and 15%.

In a more particularly preferred embodiment, the plasticizer is an oil, for example a DAO oil, comprising the respective contents:
 (i) a total content of paraffinic compounds of between 60% and 75%;
 (ii) a total content of naphthenic compounds of between 5% and 25%, for example between 15% and 25%; and
 (iii) a total content of aromatic compounds of between 5% and 25%, for example between 10% and 15%.

Oils corresponding to the above characteristics and which can be used for the preparation of the clear binder according to the invention are obtained via the processes for the deasphalting of the vacuum residues (VRs) resulting from the refining of oil, for example by deasphalting using a C3 to C6 solvent, preferably with propane. These deasphalting processes are well known to those skilled in the art and are described, for example, in Lee et al., 2014, Fuel Processing Technology, 119: 204-210: The residues resulting from the vacuum distillation (VRs) are separated according to their molecular weight in the presence of a C3 to C6 solvent (for example propane). The "DAO" oil ("deasphalted oil") thus obtained is rich in paraffin, has a very low content of asphaltenes, has an evaporation temperature of between 440° C. and 750° C. and has a much greater API gravity than that of the vacuum residues.

The respective contents of paraffinic, naphthenic and aromatic compounds depend to a certain extent on the nature of the crude oil which is the source of the DAO oil and on the refining process used. A person skilled in the art knows how to determine the respective contents of paraffinic, naphthenic and aromatic compounds of a DAO oil, for example using the SARA fractionation method, also described in Lee et al., 2014, Fuel Processing Technology, 119: 204-210, and to thus select the DAO oil suitable for the preparation of the clear binder according to the invention.

In one embodiment, the amount of plasticizer used in the process for preparing the clear binder base is from 40% to 80%, preferably from 45% to 70% by weight, relative to the total weight of clear binder base.

The Structuring Agent

The term "structuring agent" means any chemical constituent imparting mechanical properties and satisfactory cohesiveness to said binder.

The structuring agent used in the context of the invention is a resin, preferably chosen from resins of hydrocarbon-based petroleum origin, for example derived from the copolymerization of aromatic, aliphatic and cyclopentadienic petroleum fractions, taken alone or as a mixture, preferably derived from aromatic petroleum fractions. For example, it may be a polycycloaliphatic thermoplastic resin, for example of the low molecular weight hydrogenated cyclopentadiene homopolymer type.

More particularly, the hydrocarbon-based resin of the cyclopentane type has a softening point (or ring and ball point, RBSP, according to the standard NF T 66-008) of greater than 125° C., and a Gardner color index (according to the standard NF T 20-030) at most equal to 1.

Other examples of resins that may be used as structuring agent include, without being limiting, resins of plant origin obtained from vegetables and/or plants. They may be "harvest", i.e. harvested from the living plant. They may be used as they are, and are then referred to as natural resins, or they may be chemically converted, and are then referred to as modified natural resins.

Among the harvest resins are acaroid resins, dammar, natural rosins, modified rosins, rosin esters and metal resinates. These may be taken alone or as a mixture.

Among the natural rosins, mention may be made of gum and wood rosins, in particular pine rosin, and/or tall oil rosin. These natural rosins may be taken alone or as a mixture.

Among the modified rosins, mention may be made of hydrogenated rosins, disproportionated rosins, polymerized rosins and/or maleinized rosins. These modified natural rosins may be taken alone or as a mixture, and may undergo one or more disproportionation, polymerization and/or maleinization treatments.

Among the rosin esters, mention may be made of methyl esters of natural rosins, methyl esters of hydrogenated rosins, esters of glycerol and of natural rosins, esters of glycerol and hydrogenated rosins, esters of glycerol and of disproportionated rosins, esters of glycerol and of polymerized rosins, esters of glycerol and of maleinized rosins, esters of pentaerythritol and of natural rosins and esters of pentaerythritol and of hydrogenated rosins. These rosin esters may be taken alone or as a mixture and may come from rosins which have undergone one or more disproportionation, polymerization and/or maleinization treatments.

Esters of pentaerythritol and of natural rosins and esters of pentaerythritol and of hydrogenated rosins are the preferred rosin esters.

Among the metal resinates, mention may be made of metal carboxylates, for example of Ca, Zn, Mg, Ba, Pb or Co, obtained from natural rosins or from modified rosins. Calcium resinates, zinc resinates, mixed calcium/zinc resinates, taken alone or as a mixture, are preferred.

The weight ratio between the structuring agent and the plasticizer used for the preparation of the clear binder according to the invention is generally from 0.3 to 1.5, for example from 0.5 to 1.

In a specific embodiment, the amount of structuring agent used in the process for preparing the clear binder base is from 25% to 50% by weight relative to the total weight of clear binder base.

The Polymer

The polymer used in the process for preparing the first composition is a copolymer based on conjugated diene units and monovinyl aromatic hydrocarbon units. The conjugated diene is preferably chosen from those including from 4 to 8 carbon atoms per monomer, for example butadiene, 2-methyl-1,3-butadiene (isoprene), 2,3-dimethyl-1,3-butadiene, 1,3-pentadiene and 1,2-hexadiene, chloroprene, carboxylated butadiene, carboxylated isoprene, in particular butadiene and isoprene, and mixtures thereof.

The monovinyl aromatic hydrocarbon is preferably chosen from styrene, o-methylstyrene, p-methylstyrene, p-tert-butylstyrene, 2,3-dimethylstyrene, p-methylstyrene, vinylnaphthalene, vinyltoluene, vinylxylene, and the like or mixtures thereof, in particular styrene.

More particularly, the polymer consists of one or more copolymers chosen from block copolymers of styrene and butadiene, of styrene and isoprene, of styrene and chloroprene, of styrene and carboxylated butadiene or of styrene and carboxylated isoprene. A preferred copolymer is a copolymer based on butadiene units and styrene units such as the SB styrene/butadiene block copolymer or the SBS styrene/butadiene/styrene block copolymer.

The styrene/conjugated diene copolymer, in particular the styrene/butadiene copolymer, advantageously has a weight content of styrene ranging from 5% to 50%, preferably from 20% to 50%.

The styrene/conjugated-diene copolymer, in particular the styrene/butadiene copolymer, advantageously has a weight content of butadiene (1,2- and 1,4-) ranging from 50% to 95%. The styrene/conjugated-diene copolymer, in particular the styrene/butadiene copolymer, advantageously has a content by weight of 1,2-butadiene ranging from 5% to 70%, preferably from 5% to 50%. The 1,2-butadiene units are the units which result from polymerization via the 1,2 addition of butadiene units The mass-average molecular mass of the styrene/conjugated diene copolymer, and in particular that of the styrene/butadiene copolymer, may be, for example, between 10 000 and 500 000, preferably between 50 000 and 200 000 and more preferentially from 50 000 to 150 000 daltons.

In one specific embodiment, the total amount of polymer used in the process of the invention is from 0.5% to 20% by mass, preferably from 1% to 10%, preferably from 1% to 7%, for example from 2% to 5%, relative to the total mass of bitumen base or of clear binder base.

In another specific embodiment, the total amount of polymer used in the process of the invention is from 20% to 50% by mass, relative to the total mass of bitumen base or relative to the total mass of clear binder base.

In this case, the first composition is referred to as the stock solution of bitumen/polymer composition or stock solution of clear binder/polymer composition. It is intended to be transported and stored in concentrated form, and then diluted with the desired amount of bitumen base or of clear binder base just before its use as road binder or as coating binder. It is possible, according to the invention, to form pellets of bitumen or clear binder stock solution, so as to facilitate their hot transportation and storage and also their handling.

According to a variant of the invention, the polymer is chosen from micronized polymers. Preferably, according to this variant, the polymer has particles with a diameter ranging from 250 to 1000 μm, preferably with a diameter ranging from 400 to 600 μm.

Compatibilizer

Preferably, the compatibilizer is chosen from waxes, for example animal waxes, plant waxes and mineral waxes, and mixtures thereof.

Animal and plant waxes are mainly composed of mixtures of fatty acid derivatives (fatty acid esters), whereas mineral waxes are paraffin derivatives.

The Adhesion Dopants

To improve the reciprocal affinity between the binder and the aggregates and to ensure the longevity thereof, adhesion dopants may also be used in the first composition, as a mixture with the other components, especially the clear binder, or the bitumen base or the pitch. These are, for example, nitrogenous surfactant compounds derived from fatty acids (amines, polyamines, alkylpolyamine, etc.).

When they are added to the first composition, the adhesion dopants generally represent between 0.05% and 0.5% by weight relative to the weight of clear binder or of bitumen base or of pitch. For example, in a specific embodiment, 0.05% to 0.5% of amine, preferably 0.1% to 0.3% of amine, relative to the total mass of clear binder base or of bitumen base or of pitch, will be added.

Coloring Agents

The synthetic clear binder may also include one or more coloring agents, such as mineral pigments or organic dyes. The pigments are selected according to the shade and the color desired for the coating. For example, metal oxides such as iron oxides, chromium oxides, cobalt oxides or titanium oxides will be used to obtain the colors red, yellow, gray, blue-green or white. The pigments can be added either to the clear binder or to the surfacing mix (mixture with the aggregates, for example) or to an emulsion of the clear binder.

The Chemical Additive

The bitumen base or the clear binder or the mixture of bitumen base and pitch may also comprise at least one chemical additive chosen from: an organic compound, a paraffin, a polyphosphoric acid, and mixtures thereof.

In particular, when the solid material comprises at least one chemical additive, it is in a suitable amount so that its penetrability is preferably from 5 to 50 1/10 mm, and/or so that the ring and ball softening point (RBSP) is preferably greater than or equal to 60° C., it being understood that the penetrability is measured at 25° C. according to the standard EN 1426 and the RBSP is measured according to the standard EN 1427.

According to a first embodiment of the invention, the chemical additive is an organic compound. Advantageously, the organic compound has a molar mass of less than or equal to 2000 g·mol$^{-1}$, preferably a molar mass of less than or equal to 1000 g·mol$^{-1}$.

In this first embodiment, according to a first variant, the organic compound is a compound of general formula (I):

Ar1—R—Ar2     (I), in which:
Ar1 and Ar2 represent, independently of each other, a benzene nucleus or a system of fused aromatic nuclei of 6 to 20 carbon atoms, substituted with at least one hydroxyl group, and
R represents an optionally substituted divalent radical, the main chain of which comprises from 6 to 20 carbon atoms and at least one group chosen from amide, ester, hydrazide, urea, carbamate and anhydride functions.

Preferably, Ar1 and/or Ar2 are substituted with at least one alkyl group of 1 to 10 carbon atoms, advantageously in one or more ortho positions relative to the hydroxyl group(s); more preferentially, Ar1 and Ar2 are 3,5-dialkyl-4-hydroxyphenyl groups, advantageously 3,5-di-tert-butyl-4-hydroxyphenyl groups.

Preferably, R is in the para position relative to a hydroxyl group of Ar1 and/or Ar2.

Advantageously, the compound of formula (I) is 2',3-bis[(3-[3,5-di-tert-butyl-4-hydroxyphenyl]propionyl)]propionohydrazide.

According to a second variant of this first embodiment, the organic compound is a compound of general formula (II):

$$R-(NH)_n CONH-(X)_m-NHCO(NH)_n-R' \qquad (II),$$

in which:
- the groups R and R', which may be identical or different, contain a saturated or unsaturated, linear, branched or cyclic hydrocarbon-based chain, comprising from 1 to 22 carbon atoms, which is optionally substituted, and optionally comprising heteroatoms, rings and/or heterocycles;
- the group X contains a saturated or unsaturated, linear, cyclic or branched hydrocarbon-based chain, comprising from 1 to 22 carbon atoms, which is optionally substituted, and optionally comprising heteroatoms, rings and/or heterocycles;
- n and m are integers having a value of 0 or 1, independently of each other.

According to this variant, when the integer m has a value of 0, then the groups $R-(NH)_n CONH$ and $NHCO(NH)_n-R'$ are covalently bonded via a hydrazide bond CONH—NHCO. The group R, or the group R', then comprises at least one group chosen from: a hydrocarbon-based chain of at least 4 carbon atoms, an aliphatic ring of 3 to 8 atoms, an aliphatic, partially aromatic or totally aromatic fused polycyclic system, each ring comprising 5 or 6 atoms.

Still according to this variant, when the integer m has a value of 1, then the group R, the group R' and/or the group X comprises at least one group chosen from: a hydrocarbon-based chain of at least 4 carbon atoms, an aliphatic ring of 3 to 8 atoms, an aliphatic, partially aromatic or totally aromatic fused polycyclic system, each ring comprising 5 or 6 atoms.

Preferably, the group R and/or R' comprises an aliphatic hydrocarbon-based chain of 4 to 22 carbon atoms, chosen especially from $C_4H_9$, $C_5H_{11}$, $C_9H_{19}$, $C_{11}H_{23}$, $C_{12}H_{25}$, $C_{17}H_{35}$, $C_{18}H_{37}$, $C_{21}H_{43}$ and $C_{22}H_{45}$ groups.

Preferably, the group X represents a linear saturated hydrocarbon-based chain comprising from 1 to 22 carbon atoms. Preferably, the group X is chosen from $C_2H_4$ and $C_3H_6$ groups.

Preferably, the group X may also be a cyclohexyl group or a phenyl group, and the radicals $R-(NH)_n CONH-$ and $NHCO(NH)_n-R'-$ may then be in the ortho, meta or para position. Moreover, the radicals $R-(NH)_n CONH-$ and $NHCO(NH)_n-R'-$ may be in the cis or trans position relative to each other. Furthermore, when the radical X is cyclic, this ring may be substituted with groups other than the two main groups $R-(NH)_n CONH-$ and $-NHCO(NH)_n-R'$.

Preferably, the group X comprises two rings of 6 carbons bonded via a $CH_2$ group, these rings being aliphatic or aromatic. In this case, the group X is a group including two aliphatic rings bonded via an optionally substituted $CH_2$ group, for instance:

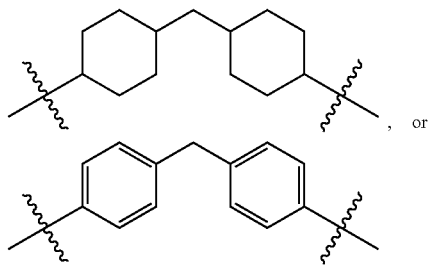, or

Advantageously, according to this variant, the organic compound is a compound of general formula (II) chosen from hydrazide derivatives such as the compounds $C_5H_{11}-CONH-NHCO-C_5H_{11}$, $C_9H_{19}-CONH-NHCO-C_9H_{19}$, $C_{11}H_{23}-CONH-NHCO-C_{11}H_{23}$, $C_{17}H_{35}-CONH-NHCO-C_{17}H_{35}$, or $C_{21}H_{43}-CONH-NHCO-C_{21}H_{43}$; diamides such as N,N'-ethylenedi(stearamide) of formula $C_{17}H_{35}-CONH-CH_2-CH_2-NHCO-C_{17}H_{35}$; and ureide derivatives such as 4,4'-bis(dodecylaminocarbonylamino)diphenylmethane of formula $C_{12}H_{25}-NHCONH-C_6H_4-CH_2-C_6H_4-NHCONH-C_{12}H_{25}$.

Preferably, the compound of general formula (II) is chosen from those which satisfy the condition n=0.

Preferably, the compound of general formula (II) is chosen from those which satisfy the condition: the sum of the numbers of carbon atoms of R, X and R' is greater than or equal to 10, advantageously greater than or equal to 14, preferably greater than or equal to 18.

Preferably, the compound of general formula (II) is chosen from those which satisfy the condition: the number of carbon atoms of at least one from among R and R' is greater than or equal to 10, advantageously greater than or equal to 12, preferably greater than or equal to 14.

Preferably, according to a first variant, the compound of general formula (II) is chosen from those of formula (IIA):

$$R-CONH-(X)_m-NHCO-R' \qquad (IIA)$$

in which R, R', m and X have the same definition as above.

Preferably, in the formula (IIA), when m=1, the X group represents a saturated linear hydrocarbon-based chain comprising from 1 to 22 carbon atoms; advantageously, X represents a saturated linear hydrocarbon-based chain comprising from 1 to 12 carbon atoms and better still from 1 to 4 carbon atoms. Preferably, the group X is chosen from $C_2H_4$ and $C_3H_6$ groups.

Preferably, the compound of general formula (IIA) is chosen from those which satisfy the condition: the sum of the numbers of carbon atoms of R, X and R' is greater than or equal to 10, advantageously greater than or equal to 14, preferably greater than or equal to 18.

Preferably, the compound of general formula (IIA) is chosen from those which satisfy the condition: the number of carbon atoms of at least one from among R and R' is greater than or equal to 10, advantageously greater than or equal to 12, preferably greater than or equal to 14.

More preferentially, according to this variant, the compound of general formula (IIA) is chosen from hydrazide derivatives, such as the compounds $C_5H_{11}-CONH-NHCO-C_5H_{11}$, $C_9H_{19}-CONH-NHCO-C_9H_{19}$, $C_{11}H_{23}-CONH-NHCO-C_{11}H_{23}$, $C_{17}H_{35}-CONH-NHCO-C_{17}H_{35}$ or $C_{21}H_{43}-CONH-NHCO-C_{21}H_{43}$; diamides, such as N,N'-ethylenedi(laurylamide) of formula $C_{11}H_{23}-CONH-CH_2-CH_2-NHCO-C_{11}H_{23}$, N,N'- ethylenedi(myristylamide) of formula $C_{13}H_{27}$—CONH—$CH_2$—$CH_2$—NHCO—$C_{13}H_{27}$, N,N'-ethylenedi(palmitamide) of formula $C_{15}H_{31}$—CONH—$CH_2$—$CH_2$—NHCO—$C_{15}H_{31}$ or N,N'-ethylenedi(stearamide) of formula $C_{17}H_{35}$—CONH—$CH_2$—$CH_2$—NHCO—$C_{17}H_{35}$; monoamides, such as laurylamide of formula $C_{11}H_{23}$—$CONH_2$, myristylamide of formula $C_{13}H_{27}$—$CONH_2$, palmitamide of formula $C_{15}H_{31}$—$CONH_2$ or stearamide of formula $C_{17}H_{35}$—$CONH_2$.

Even more advantageously, the compound of general formula (IIA) is N,N'-ethylenedi(stearamide) of formula $C_{17}H_{35}$—CONH—$CH_2$—$CH_2$—NHCO—$C_{17}H_{35}$.

Preferably, according to a second variant, the compound of general formula (II) is chosen from those of formula (IIB):

R—CONH—R'  (IIB)

in which R and R' have the same definition as above.

Advantageously, according to this variant, the sum of the numbers of carbon atoms of R and R' is greater than or equal to 10, advantageously greater than or equal to 14, preferably greater than or equal to 18.

Even more advantageously, according to this variant, the number of carbon atoms of R is greater than or equal to 10, advantageously greater than or equal to 12, preferably greater than or equal to 14, and R'=H.

Advantageously, the compound of general formula (II) is chosen from hydrazide derivatives, such as the compounds $C_5H_{11}$—CONH—NHCO—$C_5H_{11}$, $C_9H_{19}$—CONH—NHCO—$C_9H_{19}$, $C_{11}H_{23}$—CONH—NHCO—$C_{11}H_{23}$, $C_{17}H_{35}$—CONH—NHCO—$C_{17}H_{35}$ or $C_{21}H_{43}$—CONH—NHCO—$C_{21}H_{43}$; diamides, such as N,N'-ethylenedi(laurylamide) of formula $C_{11}H_{23}$—CONH—$CH_2$—$CH_2$—NHCO—$C_1H_{23}$, N,N'-ethylenedi(myristylamide) of formula $C_{13}H_{27}$—CONH—$CH_2$—$CH_2$—NHCO—$C_{13}H_{27}$, N,N'-ethylenedi(palmitamide) of formula $C_{15}H_{31}$—CONH—$CH_2$—$CH_2$—NHCO—$C_{15}H_{31}$ or N,N'-ethylenedi(stearamide) of formula $C_{17}H_{35}$—CONH—$CH_2$—$CH_2$—NHCO—$C_{17}H_{35}$; monoamides, such as laurylamide of formula $C_{11}H_{23}$—$CONH_2$, myristylamide of formula $C_{13}H_{27}$—$CONH_2$, palmitamide of formula $C_{15}H_{31}$—$CONH_2$ or stearamide of formula $C_{17}H_{35}$—$CONH_2$.

Even more advantageously, the compound of general formula (II) is N,N'-ethylenedi(stearamide) of formula $C_{17}H_{35}$—CONH—$CH_2$—$CH_2$—NHCO—$C_{17}H_{35}$.

Preferably, when the chemical additive is chosen from the organic compounds of formula (II), it is used in combination with at least one other chemical additive chosen from the organic compounds of formulae (I), (III), (V), (VI) and (VII) and/or the reaction products of at least one C3-C12 polyol and of at least one C2-C12 aldehyde, in particular those comprising a group of formula (IV).

According to a third variant of this embodiment, the organic compound is a compound of formula (III):

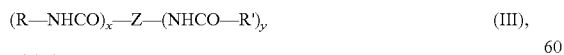

(R—NHCO)$_x$—Z—(NHCO—R')$_y$  (III), in which:

R and R', which may be identical or different, contain a saturated or unsaturated, linear, branched or cyclic hydrocarbon-based chain, comprising from 1 to 22 carbon atoms, which is optionally substituted, and optionally comprising heteroatoms, rings and/or heterocycles, Z represents a trifunctionalized group chosen from the following groups:

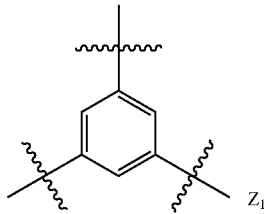

$Z_1$

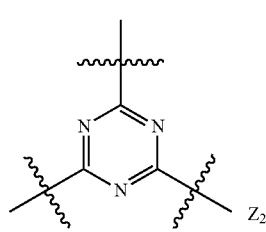

$Z_2$

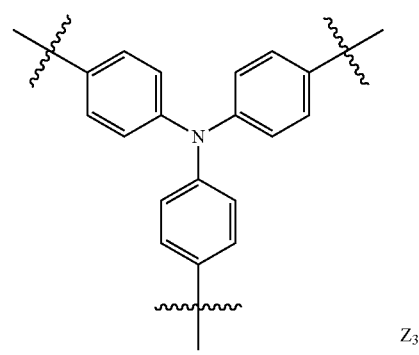

$Z_3$ x and y are different integers with a value ranging from 0 to 3, and such that x+y=3.

Preferably, when x is equal to 0 and Z represents $Z_2$, the compound of formula (III) is N2, N4, N6-tridecylmelamine having the following formula with R' representing the $C_9H_{19}$ group:

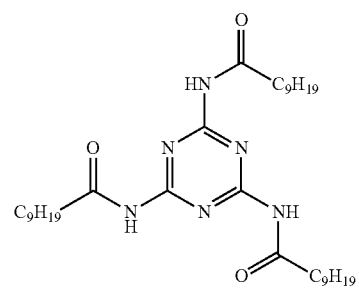

Other preferred compounds corresponding to formula (III) are such that x is equal to 0, Z represents $Z_2$ and R' represents a saturated linear hydrocarbon-based chain of 1 to 22 carbon atoms, preferably of 2 to 18 carbon atoms, preferably of 5 to 12 carbon atoms.

Other preferred compounds corresponding to formula (III) are such that: y is equal to 0 and Z represents $Z_1$, the compounds then having the formula:

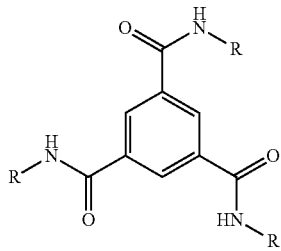

with R chosen from the following groups, taken alone or as mixtures:

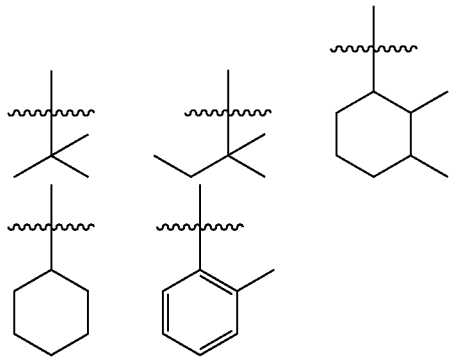

Other preferred compounds corresponding to formula (III) are such that: y is equal to 0, Z represents $Z_1$ and R represents a saturated linear hydrocarbon-based chain of 1 to 22 carbon atoms, preferably of 8 to 12 carbon atoms.

According to a fourth variant of this embodiment, the organic compound is a reaction product of at least one $C_3$-$C_{12}$ polyol and of at least one $C_2$-$C_{12}$ aldehyde. Among the polyols that may be used, mention may be made of sorbitol, xylitol, mannitol and/or ribitol. Preferably, the polyol is sorbitol.

Advantageously, according to this variant, the organic compound is a compound which comprises at least one function of general formula (IV):

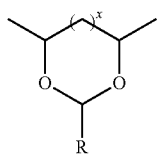

(IV)

in which:
x is an integer,
R is chosen from a $C_1$-$C_{11}$ alkyl, alkenyl, aryl or aralkyl radical, optionally substituted with one or more halogen atoms or one or more $C_1$-$C_6$ alkoxy groups.

The organic compound is advantageously a sorbitol derivative. The term "sorbitol derivative" means any reaction product obtained from sorbitol, in particular any reaction product obtained by reacting an aldehyde with D-sorbitol. Sorbitol acetals, which are sorbitol derivatives, are obtained via this condensation reaction. 1,3:2,4-Di-O-benzylidene-D-sorbitol is obtained by reacting 1 mol of D-sorbitol and 2 mol of benzaldehyde and has the formula:

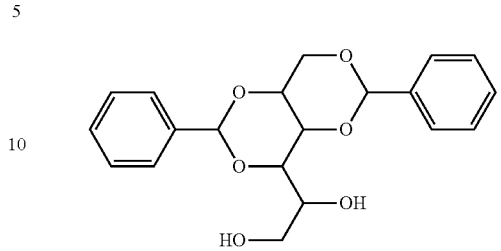

The sorbitol derivatives may thus all be condensation products of aldehydes, especially of aromatic aldehydes, with sorbitol. Sorbitol derivatives will then be obtained of general formula:

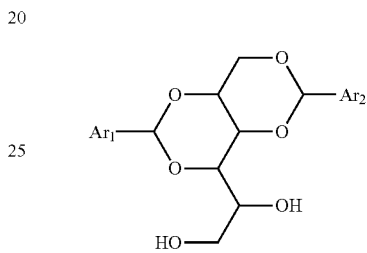

in which $Ar_1$ and $Ar_2$ are optionally substituted aromatic nuclei.

Among the sorbitol derivatives, other than 1,3:2,4-di-O-benzylidene-D-sorbitol, are, for example, 1,3:2,4:5,6-tri-O-benzylidene-D-sorbitol, 2,4-mono-O-benzylidene-D-sorbitol, 1,3:2,4-bis(p-methylbenzylidene)sorbitol, 1,3:2,4-bis(3,4-dimethylbenzylidene)sorbitol, 1,3:2,4-bis(p-ethylbenzylidene)sorbitol, 1,3:2,4-bis(p-propylbenzylidene)sorbitol, 1,3:2,4-bis(p-butylbenzylidene)sorbitol, 1,3:2,4-bis(p-ethoxylbenzylidene)sorbitol, 1,3:2,4-bis(p-chlorobenzylidene)sorbitol, 1,3:2,4-bis(p-bromobenzylidene)sorbitol, 1,3:2,4-di-O-methylbenzylidene-D-sorbitol, 1,3:2,4-di-O-dimethylbenzylidene-D-sorbitol, 1,3:2,4-di-O-(4-methylbenzylidene)-D-sorbitol and 1,3:2,4-di-O-(4,3-dimethylbenzylidene)-D-sorbitol. Preferably, according to this variant, the organic compound is 1,3:2,4-di-O-benzylidene-D-sorbitol.

According to a fifth variant of this embodiment, the organic compound is a compound of general formula (V):

R"—(COOH)$_z$ (V), in which R" represents a linear or branched, saturated or unsaturated chain comprising from 4 to 68 carbon atoms, preferably from 4 to 54 carbon atoms, more preferentially from 4 to 36 carbon atoms and z is an integer ranging from 2 to 4.

Preferably, the group R" is preferably a saturated linear chain of formula $C_wH_{2w}$ with w being an integer ranging from 4 to 22, preferably from 4 to 12.

According to this variant of the invention, the organic compounds corresponding to formula (V) may be diacids (z=2), triacids (z=3) or tetracids (z=4). The preferred organic compounds according to this variant are diacids with z=2.

Preferably, according to this variant, the diacids have the general formula HOOC—$C_wH_{2w}$—COOH with w being an integer ranging from 4 to 22, preferably from 4 to 12 and in which z=2 and R"=$C_wH_{2w}$.

Advantageously, according to this variant, the organic compound is a diacid chosen from adipic acid or 1,6-hexanedioic acid with w=4, pimelic acid or 1,7-heptanedioic acid with w=5, suberic acid or 1,8-octanedioic acid with w=6, azelaic acid or 1,9-nonanedioic acid with w=7, sebacic acid or 1,10-decanedioic acid with w=8, undecanedioic acid with w=9, 1,2-dodecanedioic acid with w=10 or tetradecanedioic acid with w=12.

Advantageously, the diacid is sebacic acid.

The diacids may also be diacid dimers of unsaturated fatty acid(s), i.e. dimers formed from at least one unsaturated fatty acid, for example from a single unsaturated fatty acid or from two different unsaturated fatty acids. Diacid dimers of unsaturated fatty acid(s) are conventionally obtained by intermolecular dimerization reaction of at least one unsaturated fatty acid (for example Diels-Alder reaction). Preferably, only one type of unsaturated fatty acid is dimerized. They are derived in particular from the dimerization of an unsaturated fatty acid especially of $C_8$ to $C_{34}$, especially of $C_{12}$ to $C_{22}$, in particular of $C_{16}$ to $C_{20}$ and more particularly of $C_{18}$. A preferred fatty acid dimer is obtained by dimerization of linoleic acid, which may then be partially or totally hydrogenated. Another preferred fatty acid dimer has the formula HOOC—$(CH_2)_7$—CH=CH—$(CH_2)_7$—COOH. Another preferred fatty acid dimer is obtained by dimerization of methyl linoleate. Similarly, fatty acid triacids and fatty acid tetracids may be found, which are obtained, respectively, by trimerization and tetramerization of at least one fatty acid.

According to a sixth variant of this embodiment, the organic compound is a compound of general formula (VI):

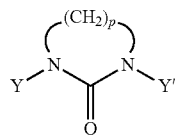

(VI)

in which:
groups Y and Y' represent, independently of each other, an atom or group chosen from: H, —$(CH_2)q$-$CH_3$, —$(CH_2)q$-$NH_2$, —$(CH_2)q$-OH, —$(CH_2)q$-COOH or

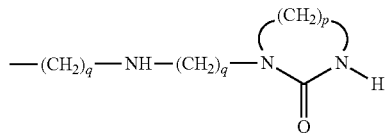

with q being an integer ranging from 2 to 18, preferably from 2 to 10, preferably from 2 to 4 and p being an integer greater than or equal to 2, preferably having a value of 2 or 3.

Among the preferred organic compounds corresponding to formula (VI), mention may be made of the following compounds:

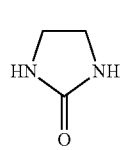 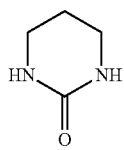

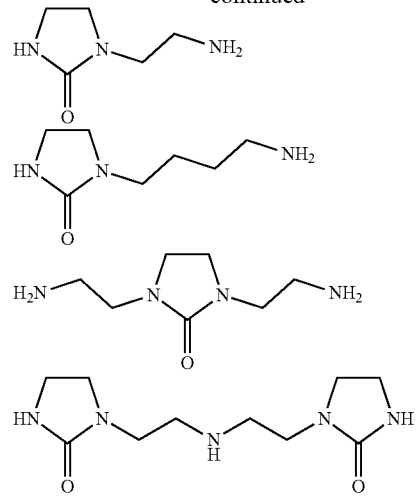

Preferably, according to this variant, the organic compound of general formula (VI) is:

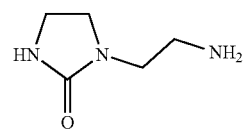

According to a seventh variant of this embodiment, the organic compound is a compound of general formula (VII):

R—NH—CO—CO—NH—R' (VII)

in which R and R', which may be identical or different, represent a saturated or unsaturated, linear, branched or cyclic hydrocarbon-based chain, comprising from 1 to 22 carbon atoms, preferably from 8 to 12 carbon atoms, which is optionally substituted, and optionally comprising heteroatoms, rings and/or heterocycles.

According to another embodiment of the invention, the chemical additive is a paraffin. Paraffins have chain lengths of from 30 to 120 carbon atoms ($C_{30}$ to $C_{120}$). The paraffins are advantageously chosen from polyalkylenes. Preferably, use will be made according to the invention of polymethylene paraffins and polyethylene paraffins. These paraffins may be of petroleum origin or may originate from the chemical industry. Advantageously, the paraffins used are synthetic paraffins derived from the conversion of biomass and/or natural gas.

Preferably, these paraffins contain a large proportion of "normal" paraffins, i.e. linear, straight-chain, unbranched paraffins (saturated hydrocarbons). Thus, the paraffins may comprise from 50% to 100% of normal paraffins and from 0 to 50% of isoparaffins and/or of branched paraffins. More preferentially, the paraffins comprise from 85% to 95% of normal paraffins and from 5% to 15% of isoparaffins and/or of branched paraffins. Advantageously, the paraffins comprise from 50% to 100% of normal paraffins and from 0 to 50% of isoparaffins. Even more advantageously, the paraffins comprise from 85% to 95% of normal paraffins and from 5% to 15% of isoparaffins.

Preferably, the paraffins are polymethylene paraffins. More particularly, the paraffins are synthetic polymethylene paraffins, for example paraffins derived from the conversion of synthesis gas via the Fischer-Tropsch process. In the Fischer-Tropsch process, paraffins are obtained by reaction of hydrogen with carbon monoxide on a metal catalyst. Fischer-Tropsch synthetic processes are described, for example, in the publications EP 1 432 778, EP 1 328 607 or EP 0 199 475.

According to another embodiment of the invention, the chemical additive is a polyphosphoric acid. Polyphosphoric acids (PPA) that may be used in the invention are described in WO 97/14753. These are compounds of empirical formula PqHrOs in which q, r and s are positive numbers such that: $q \geq 2$ and in particular q is from 3 to 20 or more and that $5q+r-2s=0$.

In particular, said polyphosphoric acids may be linear compounds of empirical formula $P_qH_{(q+2)}O_{(3q+1)}$ corresponding to the structural formula:

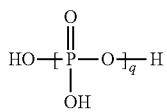

in which q has the definition given above. They may also be products of two-dimensional or three-dimensional structure.

All these polyphosphoric acids may be considered as products of polycondensation by heating aqueous metaphosphoric acid.

It would not constitute a departure from the scope of the invention to combine several different chemical additives such as different organic compounds of formulae (I), (II), (III), (V), (VI) and (VII), reaction products of at least one $C_3$-$C_{12}$ polyol and of at least one $C_2$-$C_{12}$ aldehyde, especially those comprising a group of formula (IV), and/or various paraffins and/or various polyphosphoric acids in the bitumen base.

According to one embodiment of the invention, the first composition, comprising a bitumen base, of which the core of the pellets is composed, comprises from 0.1% to 10% by mass, preferably from 0.5% to 5% by mass and more preferentially from 0.5% to 2.5% by mass of chemical additive relative to the total mass of the first composition.

According to an advantageous embodiment, the first composition comprises at least two chemical additives.

According to a first variant of this embodiment, the first composition comprises at least one first chemical additive of formula (V) and at least one second chemical additive chosen from: the chemical additives of formula (I); the chemical additives of formula (II); the chemical additives of formula (III); the chemical additives of formula (V); the chemical additives of formula (VI); the chemical additives of formula (VII) and the reaction products of at least one $C_3$-$C_{12}$ polyol and of at least one $C_2$-$C_{12}$ aldehyde, especially those comprising a group of formula (IV), the second chemical additive being different from the first chemical additive.

Preferably, and according to this first variant, the first composition comprises at least one first chemical additive of formula (V) and at least one second chemical additive of formula (II).

More preferentially, and according to this first variant, the first composition comprises at least one first additive of formula (V) and at least one second chemical additive of formula (IIA).

Preferably, and still according to this first variant, the first chemical additive of formula (V) is chosen from diacids (z=2), triacids (z=3) and tetracids (z=4), preferably from diacids (z=2).

More preferentially, and still according to this first variant, the first chemical additive of formula (V) is chosen from adipic acid or 1,6-hexanedioic acid with w=4, pimelic acid or 1,7-heptanedioic acid with w=5, suberic acid or 1,8-octanedioic acid with w=6, azelaic acid or 1,9-nonanedioic acid with w=7, sebacic acid or 1,10-decanedioic acid with w=8, undecanedioic acid with w=9, 1,2-dodecanedioic acid with w=10 or tetradecanedioic acid with w=12.

Advantageously, and according to this first variant, the first chemical additive of formula (V) is sebacic acid or 1,10-decanedioic acid with w=8.

According to a second variant of this embodiment, the first composition comprises at least one first chemical additive of formula (II) and at least one second chemical additive chosen from: the chemical additives of formula (I); the chemical additives of formula (II); the chemical additives of formula (III); the chemical additives of formula (V); the chemical additives of formula (VI); the chemical additives of formula (VII) and the reaction products of at least one $C_3$-$C_{12}$ polyol and of at least one $C_2$-$C_{12}$ aldehyde, especially those comprising a group of formula (IV), the second chemical additive being different from the first chemical additive.

Preferably, and according to this second variant, the first chemical additive of formula (II) is chosen from the chemical additives of formula (IIA).

More preferentially, and according to this second variant, the first composition comprises at least one first chemical additive of formula (IIA) and at least one second chemical additive chosen from: the chemical additives of formula (I); the chemical additives of formula (IIB); the chemical additives of formula (III); the chemical additives of formula (V); the chemical additives of formula (VI); the chemical additives of formula (VII) and the reaction products of at least one $C_3$-$C_{12}$ polyol and of at least one $C_2$-$C_{12}$ aldehyde, especially those comprising a group of formula (IV), the second chemical additive being different from the first chemical additive.

Even more preferentially, and according to this second variant, the first composition comprises at least one first additive of formula (IIA) and at least one second additive of formula (V).

Advantageously, and according to this second variant, the first chemical additive of formula (II) is N,N'-ethylenedi(stearamide).

According to a third preferred variant of this embodiment, the first composition comprises at least sebacic acid or 1,10-decanedioic acid and at least N,N'-ethylenedi(stearamide).

According to a fourth variant of this embodiment, the first composition comprises at least one first additive of formula (I) and at least one second chemical additive chosen from: the chemical additives of formula (I); the chemical additives of formula (II); the chemical additives of formula (III); the chemical additives of formula (V); the chemical additives of formula (VI); the chemical additives of formula (VII) and the reaction products of at least one $C_3$-$C_{12}$ polyol and of at least one $C_2$-$C_{12}$ aldehyde, especially those comprising a group of formula (IV), the second chemical additive being different from the first chemical additive.

Preferably, and according to this fourth variant, the second chemical additive is chosen from the chemical additives of formula (II) and the chemical additives of formula (V).

Preferably, and according to this fourth variant, the second chemical additive of formula (II) is chosen from the chemical additives of formula (IIA).

More preferentially, and according to this fourth variant, the second chemical additive of formula (II) is N,N'-ethylenedi(stearamide).

Preferably, and still according to this fourth variant, the second chemical additive of formula (V) is chosen from diacids ($z=2$), triacids ($z=3$) and tetracids ($z=4$), preferably from diacids ($z=2$).

Even more preferentially, and still according to this fourth variant, the second chemical additive of formula (V) is chosen from adipic acid or 1,6-hexanedioic acid with $w=4$, pimelic acid or 1,7-heptanedioic acid with $w=5$, suberic acid or 1,8-octanedioic acid with $w=6$, azelaic acid or 1,9-nonanedioic acid with $w=7$, sebacic acid or 1,10-decanedioic acid with $w=8$, undecanedioic acid with $w=9$, 1,2-dodecanedioic acid with $w=10$ or tetradecanedioic acid with $w=12$.

Advantageously, and still according to this fourth variant, the second chemical additive of formula (V) is sebacic acid or 1,10-decanedioic acid.

Preferably, and according to this fourth variant, the first chemical additive of formula (I) is 2',3-bis[(3-[3,5-di-tert-butyl-4-hydroxyphenyl]propionyl)]-propionohydrazide.

Preferably, and according to this embodiment, the mass ratio of the first chemical additive relative to the second chemical additive is from 1:99 to 99:1, preferably from 1:9 to 9:1, even more preferentially from 1:5 to 5:1.

Olefinic Polymer Adjuvant

According to one embodiment of the invention, the first composition may also comprise at least one olefinic polymer adjuvant.

The olefinic polymer adjuvant is preferably chosen from the group consisting of (a) ethylene/glycidyl (meth)acrylate copolymers; (b) ethylene/monomer A/monomer B terpolymers and (c) copolymers resulting from the grafting of a monomer B onto a polymer substrate.

(a) The ethylene/glycidyl (meth)acrylate copolymers are advantageously chosen from random or block, preferably random, copolymers of ethylene and of a monomer chosen from glycidyl acrylate and glycidyl methacrylate, comprising from 50% to 99.7% by mass, preferably from 60% to 95% by mass, more preferably from 60% to 90% by mass, of ethylene.

(b) The terpolymers are advantageously chosen from random or block, preferably random, terpolymers of ethylene, of a monomer A and of a monomer B.

Monomer A is chosen from vinyl acetate and $C_1$ to $C_6$ alkyl acrylates or methacrylates.

Monomer B is chosen from glycidyl acrylate and glycidyl methacrylate. The ethylene/monomer A/monomer B terpolymers comprise from 0.5% to 40% by mass, preferably from 5% to 35% by mass and more preferentially from 10% to 30% by mass of units derived from monomer A, and from 0.5% to 15% by mass and preferably from 2.5% to 15% by mass of units derived from monomer B, the remainder being formed from units derived from ethylene.

(c) The copolymers result from the grafting of a monomer B chosen from glycidyl acrylate and glycidyl methacrylate onto a polymer substrate. The polymer substrate consists of a polymer chosen from polyethylenes, especially low-density polyethylenes, polypropylenes, random or block, preferably random, copolymers of ethylene and of vinyl acetate, and random or block, preferably random, copolymers of ethylene and of $C_1$ to $C_6$ alkyl acrylate or methacrylate, comprising from 40% to 99.7% by mass and preferably from 50% to 99% by mass of ethylene. Said grafted copolymers comprise from 0.5% to 15% by mass and preferably from 2.5% to 15% by mass of grafted units derived from monomer B.

Advantageously, the olefinic polymer adjuvant is chosen from random terpolymers of ethylene (b), of a monomer A chosen from $C_1$ to $C_6$ alkyl acrylates or methacrylates and of a monomer B chosen from glycidyl acrylate and glycidyl methacrylate, comprising from 0.5% to 40% by mass, preferably from 5% to 35% by mass and more preferentially from 10% to 30% by mass of units derived from monomer A, and from 0.5% to 15% by mass and preferably from 2.5% to 15% by mass of units derived from monomer B, the remainder being formed from units derived from ethylene.

According to one embodiment of the invention, the first composition, comprising the bitumen base, of which the core of the pellets is composed, comprises from 0.05% to 15% by mass, preferably from 0.1% to 10% by mass and more preferentially from 0.5% to 6% by mass of olefinic polymer adjuvant relative to the total mass of the first composition.

According to one embodiment of the invention, the first composition may also comprise other known additives or other known elastomers for bitumen, such as SB (copolymer comprising blocks of styrene and butadiene), SBS (styrene/butadiene/styrene block copolymer), SIS (styrene/isoprene/styrene), SBS* (styrene/butadiene/styrene star block copolymer), SBR (styrene-b-butadiene rubber) or EPDM (ethylene/propylene/diene-modified) copolymers. These elastomers may also be crosslinked according to any known process, for example with sulfur. Mention may also be made of elastomers prepared from styrene monomers and butadiene monomers allowing crosslinking without a crosslinking agent, as described in WO 2007/058994 and WO 2008/137394 and by the Applicant in patent application WO 11/013073.

According to a preferred particular embodiment, the first composition comprises a combination of the chemical additive of formula (II) and the olefinic polymer adjuvant described above.

The combination in which the chemical additive is of formula (II) in which $m=0$, more preferentially in which $m=0$ and $n=0$, will be preferred.

The combination in which the olefinic polymer adjuvant is chosen from the ethylene/monomer A/monomer B terpolymers (b) described above will also be preferred.

More preferentially, the road bitumen comprises the chemical additive of formula (II) in which $m=0$, more preferentially in which $m=0$ and $n=0$ and the olefinic polymer adjuvant is chosen from the ethylene/monomer A/monomer B terpolymers (b) described above.

The Anticaking Compound:

The anticaking compound is of mineral or organic origin. The term "anticaking agent" or "anticaking compound" means any compound which limits, reduces, inhibits or delays the agglomeration and/or adhesion of the pellets together during their transportation and/or storage at ambient temperature and which ensures their fluidity during handling.

More preferentially, the anticaking compound is chosen from: talc; fines, also known as "fillers", generally less than 125 μm in diameter, such as siliceous fines, with the exception of limestone fines; sand, such as Fontainebleau sand; cement; carbon; wood residues, such as lignin, lignosulfonate, conifer needle powders or conifer cone powders, in particular of pine; rice husk ash; glass powder; clays, such as kaolin, bentonite or vermiculite; alumina, such as alumina hydrates; silica; silica derivatives, such as fumed silicas, functionalized fumed silicas, in particular hydrophobic or hydrophilic fumed silicas, pyrogenic silicas, in particular hydrophobic or hydrophilic pyrogenic silicas, silicates, silicon hydroxides and silicon oxides; plastic powder; lime; plaster; rubber crumb; polymer powder, where the polymers are such as styrene/butadiene (SB) copolymers or styrene/butadiene/styrene (SBS) copolymers; and mixtures of these materials.

Advantageously, the anticaking agent is chosen from talc; fines, generally less than 125 µm in diameter, with the exception of limestone fines, such as siliceous fines; wood residues such as lignin, lignosulfonate, conifer needle powders, conifer cone powders, in particular pine powders; glass powder; sand such as Fontainebleau sand; fumed silicas, in particular hydrophobic or hydrophilic fumed silicas; and mixtures thereof.

The anticaking compound is preferably chosen from fumed silicas.

For the purposes of the invention, the "fumed silica" and "pyrogenic silica" compounds have the same chemical definition and are recorded under the same number CAS 112 945-52-5. Consequently, for the purposes of the invention, these compounds may be employed without discrimination between them.

The term "pyrogenic silica" means either a pyrogenic silica or a pyrogenic silica derivative.

The term "pyrogenic silica" means a compound obtained by the vapor-phase hydrolysis of chlorosilanes, such as silicon tetrachloride, in a flame of oxygen and hydrogen. Such processes are generally denoted as pyrogenic processes, the overall reaction of which is: $SiCl_4 + H_2 + O_2 \rightarrow SO_2 + 4\ HCl$.

Pyrogenic silicas are distinguished from the other silicon dioxides in that they have an amorphous structure. These silicas, of high purity (>99.8% silica), have a weak hydrophilic nature (no microporosity).

Preferably, the pyrogenic silica compound is pyrogenic silica.

According to one embodiment of the invention, the pyrogenic silica compound has a specific surface area of between 25 and 420 $m^2/g$, preferentially between 90 and 330 $m^2/g$, more preferentially between 120 and 280 $m^2/g$.

The specific surface area of the pyrogenic silica, defined in $m^2/g$, commonly known as the "surface area" or "SA", is measured according to the method of S. Brunauer, P. H. Emmet and I. Teller, J. Am. Chemical Society, 60: 309 (1938) (BET).

According to one embodiment of the invention, the pyrogenic silica compound has a mean particle size of between 5 and 50 nm.

According to one embodiment of the invention, the pyrogenic silica compound has a pH of between 3 and 10, when it is in the aqueous phase.

According to one embodiment of the invention, the pyrogenic silica compound has a carbon content of between 0.1% and 10% by weight, relative to the total weight of the pyrogenic silica compound.

According to one embodiment of the invention, the pyrogenic silica compound is chosen from a hydrophilic pyrogenic silica compound, a hydrophobic pyrogenic silica compound, and mixtures thereof.

Preferably, the pyrogenic silica compound is a hydrophilic pyrogenic silica compound The term "hydrophilic" refers to a compound which is miscible with water in all proportions.

The pyrogenic silica compound, or pyrogenic silica derivative, used within the meaning of the invention may be chemically modified.

Various types of pyrogenic silica compounds are described in the following patent applications and can be used in the present invention:

silanized pyrogenic silicas, as described in WO 2004/020532 or in WO 2007/128636, hydrophilic pyrogenic silicas, as described in WO 2009/071467 and WO 2011/000133, filed in the name of Degussa AG or Degussa GmbH, fumed silicas rendered hydrophobic by a treatment using polysiloxanes, as described in WO 2008/141932, or by silanization, as described in WO 2008/141930, silicas doped with potassium oxide, as described in WO 2008/043635 and WO 2008/022836, silicas in the form of aggregates of primary particles, as described in WO 2009/015969, filed in the name of Evonik Degussa GmbH, or in WO 2010/028261, filed in the name of Cabot Corporation.

The pyrogenic silica compound may be used alone or as a mixture in a coating composition.

Whether it is used alone or as a mixture in a composition, the pyrogenic silica compound may be used in the process according to the invention in the form of a powder or as a dispersion in a solvent which evaporates after application.

Preferably, when the composition comprises at least one pyrogenic silica compound and at least one solvent, the composition comprises from 5% to 70% by weight of pyrogenic silica compound, relative to the total weight of the composition, more preferentially from 20% to 40% by weight.

Preferably, the solvent is an organic solvent or water. The term "organic solvent" means any solvent which is immiscible with a bitumen, such as an alcohol, for example ethanol.

The pyrogenic silica compounds used in the invention are commercially available and may be sold, for example, by Evonik Degussa under the brand name Aerosil®, for instance Aerosil® 200, by Cabot Corporation under the brand names Cab-O-Sil® and Cab-O-Sperse® or by Wacker Chemie AG under the brand name HDK®.

According to one embodiment of the invention, the mass of the pyrogenic silica compound covering at least part of the surface of the pellets is between 0.2% and 10% by mass, preferably between 0.5% and 8% by mass, more preferentially between 0.5% and 5% relative to the total mass of the first composition.

The pellets of the first composition are covered with the pyrogenic silica compound according to any known process, for example according to the process described in U.S. Pat. No. 3,026,568.

According to one embodiment of the invention, the core of the pellets also comprises at least one pyrogenic silica compound as defined above.

Preferably, the core of the pellets of the first composition also comprises between 0.5% and 20% by mass, preferably between 2% and 20% by mass, more preferentially between 4% and 15% by mass, of the pyrogenic silica compound relative to the total mass of the first composition.

Viscosifying Compound:

For the purposes of the invention, the terms "viscosifying agent" and "viscosifying compound" are used equivalently and independently of each other. The term "viscosifying agent" or "viscosifying compound" means a compound which has the property of decreasing the fluidity of a liquid or a composition and thus of increasing the viscosity thereof.

For the purposes of the invention, the viscosifying agent is a material with a dynamic viscosity greater than or equal to 50 $mPa \cdot s^{-1}$, preferably from 50 $mPa \cdot s^{-1}$ to 550 $mPa \cdot s^{-1}$, more preferentially from 80 mPa·s$^{-1}$ to 450 mPa·s$^{-1}$, the viscosity being a Brookfield viscosity measured at 65° C. The viscosity of a viscosifying agent according to the invention is measured at 65° C. by means of a Brookfield CAP 2000+ viscometer and at a rotation speed of 750 rpm. The measurement is read after 30 seconds for each temperature.

Preferably, the viscosifying agent is chosen from:
gelling compounds preferably of plant or animal origin, such as: gelatin, agar-agar, alginates, cellulose derivatives, starches, modified starches, or gellan gums;
polyethylene glycols (PEG) such as PEGs with a molecular weight of between 800 g·mol$^{-1}$ and 8000 g·mol$^{-1}$, for instance a PEG with a molecular weight of 800 g·mol$^{-1}$ (PEG-800), a PEG with a molecular weight of 1000 g·mol$^{-1}$ (PEG-1000), a PEG with a molecular weight of 1500 g·mol$^{-1}$ (PEG-1500), a PEG with a molecular weight of 4000 g·mol$^{-1}$ (PEG-4000) or a PEG with a molecular weight of 6000 g·mol$^{-1}$ (PEG-6000);
mixtures of such compounds.

Advantageously, the viscosifying agent is chosen from:
gelling compounds preferably of plant or animal origin, such as: gelatin, agar agar, alginates, cellulose derivatives or gellan gums;
polyethylene glycols (PEG) such as PEGs with a molecular weight of between 800 g·mol$^{-1}$ and 8000 g·mol$^{-1}$, for instance a PEG with a molecular weight of 800 g·mol$^{-1}$ (PEG-800), a PEG with a molecular weight of 1000 g·mol$^{-1}$ (PEG-1000), a PEG with a molecular weight of 1500 g·mol$^{-1}$ (PEG-1500), a PEG with a molecular weight of 4000 g·mol$^{-1}$ (PEG-4000) or a PEG with a molecular weight of 6000 g·mol$^{-1}$ (PEG-6000);
mixtures of such compounds.

The Coating Layer:

According to a first embodiment of the invention, the coating layer is obtained by applying a composition (second composition) comprising at least one anticaking compound over all or part of the surface of the core of the pellets, especially of solid bitumen.

Preferably, according to this embodiment, the coating layer consists essentially of one or more anticaking compounds.

Preferably, according to this embodiment, the mass of the anticaking compound covering at least part of the surface of the pellets is from 0.2% to 20% by mass, preferably from 0.5% to 20% by mass, preferably from 2% to 20% by mass, more preferentially from 4% to 15% by mass, relative to the total mass of the cores of the pellets, especially of bitumen base of the pellets.

According to this embodiment, and when the anticaking compound is chosen from pyrogenic silica compounds, the mass of the pyrogenic silica compound covering at least part of the surface of the pellets is between 0.2% and 10% by mass, preferably between 0.5% and 8% by mass, more preferentially between 0.5% and 5%, relative to the total mass of the first composition.

According to a second embodiment of the invention, the coating layer is obtained by applying a composition (second composition) comprising at least one viscosifying compound and at least one anticaking compound over all or part of the surface of the core of the pellets, especially of solid bitumen.

Preferably, the coating layer, formed from the second composition, is solid at ambient temperature, including at elevated ambient temperature.

Preferably, the second composition, comprising at least one viscosifying compound and at least one anticaking compound, has a viscosity of greater than or equal to 200 mPa·s$^{-1}$, preferably of between 200 mPa·s$^{-1}$ and 700 mPa·s$^{-1}$, the viscosity being a Brookfield viscosity.

Preferentially, the second composition comprises at least 10% by mass of at least one viscosifying compound relative to the total mass of the second composition, preferably from 10% to 90% by mass, more preferentially from 10% to 85% by mass.

Advantageously, when the viscosifying agent is a gelling agent, for instance gelatin, the second composition comprises from 10% to 90% by mass of viscosifying compound relative to the total mass of the second composition, preferably from 15% to 85% and better still from 15% to 60%.

Advantageously, when the viscosifying agent is a gelling agent, for instance gelatin, the second composition comprises from 10% to 90% by mass of anticaking compound relative to the total mass of the second composition, preferably from 15% to 85% and better still from 40% to 85%.

Advantageously, when the viscosifying agent is a PEG, for instance a PEG with a molecular weight of between 800 g·mol$^{-1}$ and 8000 g·mol$^{-1}$, the second composition comprises from 10% to 90% by mass of viscosifying compound relative to the total mass of the second composition, preferably 40% to 90% and better still from 60% to 90%.

Advantageously, when the viscosifying agent is a PEG, for instance a PEG with a molecular weight of between 800 g·mol$^{-1}$ and 8000 g·mol$^{-1}$, the second composition comprises from 10% to 90% by mass of anticaking compound relative to the total mass of the second composition, preferably from 10% to 60% and better still from 10% to 40%.

Preferentially, the second composition comprises at least 10% by mass of an anticaking compound relative to the total mass of the second composition, preferably from 10% to 90% by mass and even more preferentially from 15% to 90% by mass.

Preferably, according to this embodiment, the coating layer represents at least 5% by mass relative to the total mass of the pellets, preferably from 10% to 60% by mass, more preferentially from 10% to 50%.

Besides the viscosifying compound and the anticaking compound, the second composition forming the coating layer may optionally comprise one or more compounds chosen from: chemical additives, polymers, etc.

Advantageously, the viscosifying compound and the anticaking compound represent at least 90% by mass relative to the total mass of the second composition forming the coating layer, better still at least 95% by mass and advantageously at least 98% by mass.

According to a preferred embodiment of this second variant, the second composition is essentially constituted of the viscosifying compound and of the anticaking compound.

Uses of the Solid Bitumen Pellets

The pellets of solid material, preferably of solid bitumen, obtained via the process of the invention may be used as road binder.

The road binder may be used for manufacturing surfacing mixes, in combination with aggregates, according to any known process.

Preferably, the pellets of material that is solid at ambient temperature according to the invention are used for manufacturing surfacing mixes.

Bituminous surfacing mixes are used as materials for the construction and maintenance of road foundations and of their coating, and also for performing all roadway works. Examples that may be mentioned include surface dressings, hot surfacing mixes, cold surfacing mixes, cold cast surfacing mixes, emulsion gravels, base courses, tie coats, tack coats and wearing courses, and other combinations of a bituminous binder and of the road aggregate having particular properties, such as rutting-resistant courses, draining surfacing mixes, or asphalts (mixture between a bituminous binder and aggregates such as sand).

The pellets of solid material, especially of solid bitumen, obtained via the process of the invention may be used in a process for manufacturing surfacing mixes comprising at least one road binder and aggregates, the road binder being chosen from the pellets of solid material, especially of bitumens according to the invention, this process comprising at least the steps of:
heating the aggregates to a temperature ranging from 100° C. to 180° C., preferably from 120° C. to 160° C.,
mixing the aggregates with the road binder in a tank such as a mixer or a mixing drum,
obtaining surfacing mixes.

The process of the invention has the advantage of being able to be performed without a preliminary step of heating the pellets of solid material, especially of solid bitumen.

The process for manufacturing surfacing mixes does not require a step of heating of the pellets of solid material, especially of solid bitumen, before mixing with the aggregates, since, on contact with the hot aggregates, the solid material, especially the bitumen that is solid at ambient temperature, melts.

The solid material, especially the bitumen that is solid at ambient temperature obtained via the process according to the invention as described above has the advantage of being able to be added directly to the hot aggregates, without having to be melted prior to mixing with the hot aggregates.

Preferably, the step of mixing of the aggregates and of the road binder is performed with stirring, and stirring is then maintained for not more than 5 minutes, preferably not more than 1 minute to allow the production of a homogeneous mixture.

The solid material, especially the solid bitumen, in the form of pellets obtained according to the process of the present invention is noteworthy in that it allows the transportation and/or storage of solid material, especially of road bitumen, at ambient temperature under optimum conditions, in particular without there being any agglomeration and/or adhesion of the solid material, especially of solid bitumen, during its transportation and/or its storage, even when the ambient temperature is high. Moreover, the coating layer of the pellets breaks under the effect of the contact with the hot aggregates and of shear, and it releases the first composition, especially the bitumen base. Finally, the presence of the coating layer in the mixture of road binder and of aggregates does not degrade the properties of said road bitumen for a road application, when compared with an uncoated bitumen base.

Process for Transporting and/or Storing and/or Handling a Solid Material which can be Used as Road Binder or as Coating Binder The pellets obtained via the process of the invention may be transported and/or stored and/or handled in the form of pellets of solid material, especially of bitumen, which are solid at ambient temperature.

The solid material, especially the road bitumen, may be transported and/or stored at elevated ambient temperature for a period of more than or equal to 2 months, preferably more than or equal to 3 months.

Preferably, the elevated ambient temperature is from 20° C. to 90° C., preferably from 20° C. to 80° C., more preferentially from 40° C. to 80° C. and even more preferentially from 40° C. to 60° C.

The pellets of solid material, especially of bitumen, obtained via the process according to the invention have the advantage of conserving their divided form, and thus of being able to be handled, after storage and/or transportation at elevated ambient temperature. They in particular have the capacity of flowing under their own weight without undergoing creep, which allows them to be stored conditioned in bags, drums or containers of any shape or volume, and then to be transferred from this conditioning into equipment, such as worksite equipment (tank, mixer, etc.).

The pellets of solid material, especially of bitumen, are preferably transported and/or stored in bulk in 1 kg to 100 kg or 500 kg to 1000 kg bags, commonly known in the field of road bitumens as "big bags", said bags preferably being made of hot-melt material. They may also be transported and/or stored in bulk in 5 kg to 30 kg boxes or in 100 kg to 200 kg drums.

The various embodiments, variants, preferences and advantages described above for each of the subjects of the invention apply to all the subjects of the invention and may be taken separately or in combination.

The invention is illustrated by the following examples, which are given without any implied limitation.

Device

The invention also relates to a device for performing the process described above. This device described in FIGS. 1 to 3 is a machine for the extrusion in the form of pellets, also known as pelletizing, on a conveyor belt, of a fluid mass of material which is solid at ambient temperature, which may be used as road binder or as sealing binder, such as a road bitumen, a pitch, a stock solution for a bitumen/polymer composition or a clear binder. Such a device constitutes an improvement of the device described in U.S. Pat. No. 4,279,579. This device 1 comprises: a first cylindrical drum 4A arranged above the conveyor belt 6 and capable of rotating about a longitudinal axis, said first drum 4A comprising a plurality of first passages 5A through the periphery of the drum 4A, a second cylindrical drum 4B coaxial with the first drum 4A, including means 17 for longitudinally introducing into said second drum 4B the mass to be extruded and including on a part of its wall a plurality of second passages 5B directed toward the conveyor belt 6 and aligned radially with said first passages 5A, said wall part 19 being arranged adjacent to said first drum 4A, said first drum 4A being mounted to allow its continuous rotation through 360° about the longitudinal axis relative to said second drum 4B so that the relative rotation between said drums 4A and 4B sequentially produces a misalignment and an alignment of the first passages 5A and second passages 5B to allow the fluid mass to move radially outward through the aligned passages 5A, 5B and onto the conveyor belt 6A, this device also comprising, as illustrated in FIG. 1:

a reservoir 11 equipped with heating means (not shown) and with stirring means 13, making it possible to bring the contents of the reservoir 11 to the fluid state,
one or more injection channels 3 for transferring the fluid bitumen composition 2 into the second drum 4B,
a reservoir 14 into which may be introduced an additive composition 15, the reservoir 14 being connected to the injection channel 3 via an injector 16 and allowing injection of the additive composition 15 into the bitumen composition 2 in the channel 3, located downstream of the reservoir 11 and upstream of the twin drum 4.

As described in U.S. Pat. No. 4,279,579, preferably, this device also comprises a spatula for removing the excess mass from the perimeter of said first drum 4A, said spatula being directed toward said first drum 4A generally in the direction of rotation thereof, said spatula being pressed firmly against the perimeter of said first drum 4A in the region of said first passages 5A so as to scrape off the excess mass in said first passages 5A.

As described in U.S. Pat. No. 4,279,579, preferably, the first passages 4A which are offset on the circumference are connected together via grooves arranged along the periphery of the first drum 4A.

As described in U.S. Pat. No. 4,279,579, preferably, each groove is prolonged in a spiral direction, each groove connecting the apertures that are in parallel planes which are arranged perpendicularly to the axis of the drum and which are located on different longitudinal imaginary lines extending along the periphery of said first drum.

A subject of the invention is also a device for the extrusion of drops of a fluid mass on a conveyor belt 6, said device comprising: a first cylindrical drum 4A comprising a plurality of first passages 5A, a second cylindrical drum 4B arranged inside said first drum 4A and comprising a plurality of second passages 5B, means 17 for introducing a fluid material into said second drum 4B, means for producing a relative rotation between said drums 4A, 4B, to periodically align said first passages 4A and second passages 4B so as to deposit drops 7 of fluid material through the passages 4A, 4B, and onto the conveyor 6, said first and second drums 4A, 4B being mounted in order to be radially separated from each other during said relative rotation so as to form a gap between said first and second drums 4A, 4B under negative pressure at a place opposite the place where the passages are regularly aligned, so as to suck in the mass of excess material in said passages 5A of said first drum 4A, this device also comprising, as illustrated in FIG. 1:
- a reservoir 11 equipped with heating means (not shown) and with stirring means 13, making it possible to bring the contents of the reservoir 11 to the fluid state,
- one or more injection channels 3 for transferring the fluid bitumen composition 2 into the second drum 4B,
- a reservoir 14 into which may be introduced an additive composition 15, the reservoir 14 being connected to the injection channel 3 via an injector 16 and allowing injection of the additive composition 15 into the bitumen composition 2 in the channel 3, located downstream of the reservoir 11 and upstream of the twin drum 4.

As described in U.S. Pat. No. 4,279,579, preferably, said gap is formed by a recess in the periphery of the second drum 5B, the outside diameter of said recess being less than the inside diameter of said first drum 5A.

As described in U.S. Pat. No. 4,279,579, preferably, the device comprises a spatula in contact with the periphery of the first drum to push the excess material into the first passages 5A, said spatula being disposed in the region of said gap.

As described in U.S. Pat. No. 4,279,579, preferably, the device comprises a tight joint around the periphery of the cover of the first drum 4B to cover the sector formed by the gap.

As described in U.S. Pat. No. 4,279,579, preferably, the cover is bordered at its longitudinal ends with curved guide ribs having a contour corresponding to that of the first drum.

As described in U.S. Pat. No. 4,279,579, preferably, the guide bands comprise front ends which are longitudinally beveled inward to direct the excess material toward the spatula.

As described in U.S. Pat. No. 4,279,579, preferably, the first drum 4A is capable of rotating.

EXAMPLES

Material and Methods

The rheological and mechanical features of the bitumens to which reference is made in these examples are measured in the manner indicated in table 1.

TABLE 1

| Property | Abbreviation | Unit | Measurement standard |
|---|---|---|---|
| Needle penetrability at 25° C. | $P_{25}$ | 1/10 mm | NF EN 1426 |
| Ring and ball softening point | RBSP | ° C. | NF EN 1427 |

The variation in ring and ball softening point (RBSP) is measured according to the standard NF EN 1427 of said composition between the sample extracted from the top part of the sample tube and the sample extracted from the bottom part of the sample tube.

Experimental Section

The bitumen base $B_2$ is prepared from:
- a bitumen base of grade 35/50, denoted $B_1$, having a penetrability $P_{25}$ of 34 1/10 mm and an RBSP of 52.6° C. and commercially available from the Total group under the brand name Azalt®;
- 1,10-decanedioic acid, denoted Additive A1.

The bitumen base $B_3$ is prepared from:
- a bitumen base of grade 35/50, denoted $B_1$, having a penetrability $P_{25}$ of 34 1/10 mm and an RBSP of 52.6° C. and commercially available from the Total group under the brand name Azalt®;
- 1,10-decanedioic acid, denoted Additive A1;
- and N,N-ethylenebis(stearamide), denoted Additive A2.

I—Preparation of the Bitumen Cores of the Solid Bitumen Pellets

The mass percentage amounts used for each bitumen are indicated in table 2 below.

TABLE 2

| Bitumen | $B_2$ | $B_3$ |
|---|---|---|
| Bitumen base $B_1$ | 98.5% | 96% |
| Additive A1 | 1.5% | 1.5% |
| Additive A2 | — | 2.5% |
| P25 (1/10 mm) | 14 | 20 |
| RBSP (° C.) | 93 | 105.5 |

The bitumen is prepared in the following manner.

For bitumen $B_2$, the bitumen base $B_1$ is introduced into a reactor maintained at 160° C. with stirring at 300 rpm for two hours. Additive A1 is then introduced into the reactor. The contents of the reactor are maintained at 160° C. with stirring at 300 rpm for 1 hour.

For bitumen $B_3$, the bitumen base $B_1$ is introduced into a reactor maintained at 160° C. with stirring at 300 rpm for two hours. Additive A1 and additive A2 are then introduced into the reactor. The contents of the reactor are maintained at 160° C. with stirring at 300 rpm for 1 hour.

In order to prepare the pellet cores from the bituminous compositions described above, a device and a process as described in great detail in patent U.S. Pat. No. 4,279,579 are used. Various models of this device are commercially available from the company Sandvik under the trade name Rotoform.

The bituminous composition $B_1$, $B_2$ or $B_3$ is poured into reservoir 11 of the device 1 and maintained at a temperature of between 130 and 270° C.

One or more injection nozzles 3 allow the transfer of the bitumen composition $B_1$, $B_2$ or $B_3$ into the double pelletizing drum 4 including an outer rotating drum, the two drums being equipped with slots, nozzles and orifices allowing the pelletizing of bitumen drops 7 through the first stationary drum and orifices 5 with a diameter of between 2 and 10 mm of the outer rotating drum. Under the effect of the substantially homogeneous internal pressure inside the twin drum 4 of the device 1, the drops 7 with a diameter of between 2 and 10 mm are regularly pelletized through the orifices 5. The bitumen drops 7 are deposited on the upper face 6A of a horizontal conveyor belt 6, driven by the rollers 12A and 12B, and one end of which is placed under the twin drum 4. The tangential speed $V_T$ of the twin drum 4 is parallel to the conveyor belt 6 and in the same direction as the speed $V_R$ of the conveyor belt 6 with $V_R$ and $V_T$ being substantially identical and having a speed $V_T$=3 m/minute. The conveyor belt 6, which is 10 m long and 60 cm wide, is equipped with four thermal conditioning devices 8 respectively on two sections S1 and S2 including nozzles 8, 9 for vaporizing water onto the lower face 6B of the conveyor belt 6. Section S1 conditions the conveyor belt 6 at ambient temperature (22-28° C.) and section S2 cools the conveyor belt to a temperature below 20° C. At the end of the conveyor belt opposite the twin drum 4, the drops of bitumen 7 are transferred to receiving means 10 consisting of a storing device, which is big bags. Bitumen pellets $G_1$, $G_2$ and $G_3$ were obtained, respectively, from the bituminous bases $B_1$, $B_2$ and $B_3$ according to the process described above. These pellets are solid at ambient temperature.

II—General Method for Preparing the Solid Bitumen Pellets According to the Invention Comprising a Coating Layer The bitumen pellets obtained previously are left at ambient temperature for 10 to 15 minutes. The pellets thus formed are covered on their surface with an anticaking compound and then screened to remove the excess anticaking compound.

The bitumen pellets $G_1'$, $G_2'$ and $G_3'$ are prepared from the bitumen pellets $G_1$, $G_2$ and $G_3$ obtained previously and according to the method described above using, as anticaking compound, pyrogenic silica commercially available under the reference Aerosil®200.

The mass percentage of the coating for the pellets $G_1'$, $G_2'$ and $G_3'$ is about 1% by mass relative to the total mass of the bitumen of the pellets.

III—Stability on Storage

Test of Load Strength of the Pellets:

This test is performed in order to evaluate the load strength of the bitumen pellets prepared above at a temperature of 65° C. under a compressive load. Specifically, this test makes it possible to simulate the temperature and compression conditions of the pellets on each other, to which they are subjected during transportation and/or storage in bulk in 10 to 100 kg bags or in 500 to 1000 kg big bags or in 200 kg drums, and to evaluate their strength under these conditions.

The load strength test is performed according to the following protocol: 5 mL of pellets are placed in a 20 mL syringe and the plunger is then placed on the pellets together with a mass of 208 g, representing a force applied as in a big bag. The whole is placed in an oven at 65° C. for at least 4 hours. The observations are collated in table 3 below.

TABLE 3

| | Pellets | | | | | |
|---|---|---|---|---|---|---|
| | $G_1$ | $G_1'$ | $G_2$ | $G_2'$ | $G_3$ | $G_3'$ |
| Ambient temperature strength at 65° C. | -- | - | + | ++ | + | +++ |

+++: the pellets keep their initial shape and do not adhere together.
++: the pellets do not adhere together but are slightly deformed.
+: the pellets adhere together slightly.
-: the pellets are partially molten.
--: the pellets are molten.

Pellets $G_2'$ and $G_3'$ show very good strength at an ambient temperature of 60° C. insofar as they keep their initial shape and do not adhere together. Thus, the handling and transportation/storage of said pellets $G_2'$ and $G_3'$ will be easy insofar as the pellets do not melt and do not agglomerate together at elevated ambient temperature.

The invention claimed is:

1. A process for manufacturing a material that can be used as road binder or as sealing binder, which is solid at ambient temperature in the form of pellets comprising a core based on a first composition and a coating layer based on a second composition, the first composition comprising at least one material chosen from: a bitumen base, a pitch, a clear binder, and a mixture of these materials, and at least one chemical additive chosen from the group consisting of:

a polyphosphoric acid,
a compound of general formula (I):

$$\text{Ar1—R—Ar2} \qquad (I),$$

in which:
Ar1 and Ar2 represent, independently of each other, a benzene nucleus or a system of fused aromatic nuclei of 6 to 20 carbon atoms, substituted with at least one hydroxyl group, and
R represents an optionally substituted divalent radical, the main chain of which comprises from 6 to 20 carbon atoms and at least one group chosen from amide, ester, hydrazide, urea, carbamate and anhydride functions;

a compound of general formula (II):

$$\text{R—(NH)}_n\text{CONH—(X)}_m\text{—NHCO(NH)}_n\text{—R'} \qquad (II),$$

in which:
the groups R and R', which may be identical or different, contain a saturated or unsaturated, linear, branched or cyclic hydrocarbon-based chain, comprising from 1 to 22 carbon atoms, which is optionally substituted, and optionally comprising heteroatoms, rings and/or heterocycles;
the group X contains a saturated or unsaturated, linear, cyclic or branched hydrocarbon-based chain, comprising from 1 to 22 carbon atoms, which is optionally substituted, and optionally comprising heteroatoms, rings and/or heterocycles; and
n and m are integers having a value of 0 or 1, independently of each other;

and a compound of general formula (V):

$$R''-(COOH)_z \quad (V),$$

in which:
- R'' represents a linear or branched, saturated or unsaturated chain comprising from 4 to 68 carbon atoms, and
- z is an integer ranging from 2 to 4, the process comprising
- granulating with a device intended for granulation that comprises at least two coaxial drums and a horizontal conveyor belt, wherein the at least two coaxial drums include an immobile internal drum comprising at least one orifice and a rotating external drum comprising a plurality of orifices, the drums being placed above one end of the horizontal conveyor belt, driven at a speed VR, the conveyor belt being conditioned at ambient temperature over a first section of its path, and at a temperature of less than or equal to 20° C. over a second section of its path via thermal conditioning means, the process comprising at least:
  (i) heating the first composition to a temperature at which it is in fluid form,
  (ii) introducing the first composition in the fluid form into the internal drum of the granulating device,
  (iii) distributing the first composition outwards, in a form of drops through orifices of the external rotating drum,
  (iv) depositing the drops on the conveyor belt, and
  (v) coating the drops with the second composition.

2. The process as claimed in claim 1, which also comprises, after step (iv), between steps (iv) and (v), a step (iv') of cooling the drops of the first composition.

3. The process as claimed in claim 1, wherein the rotating external drum of the device includes orifices with a diameter ranging from 2 to 10 mm.

4. The process as claimed in claim 3, wherein the orifices have a diameter ranging from 2 to 8 mm.

5. The process as claimed in claim 4, wherein the orifices have a diameter ranging from 3 to 7 mm.

6. The process as claimed in claim 5, wherein the orifices have a diameter ranging from 3.5 to 6 mm.

7. The process as claimed in claim 1, wherein, in step (i), the first composition is brought to a temperature ranging from 100 to 270° C.

8. The process as claimed in claim 7, wherein, in step (i), the first composition is brought to a temperature ranging from 100 to 180° C.

9. The process as claimed in claim 8, wherein, in step (i), the first composition is brought to a temperature ranging from 120 to 160° C.

10. The process as claimed in claim 9, wherein, in step (i), the first composition is brought to a temperature ranging from 130 to 150° C.

11. The process as claimed in claim 1, wherein the speed VR of the conveyor belt is less than 4 m/min.

12. The process as claimed in claim 1, for manufacturing a composition of material that can be used as road binder or as coating binder, which is solid at ambient temperature and which has stability on transportation and on storage at a temperature ranging from 20 to 80° C. for a period of greater than or equal to 2 months.

13. The process as claimed in claim 12, wherein the composition of material has stability on transportation and on storage at a temperature ranging from 20 to 80° C. for a period of greater than or equal to 3 months.

14. The process as claimed in claim 1, wherein the second composition comprises at least one anticaking compound.

15. The process as claimed in claim 14, wherein the anticaking compound is selected from the group consisting of talc, siliceous fines, sand, cement, carbon, wood residues, rice husk ash, glass powder, clays, alumina, silica, fumed silica, functionalized fumed silica, pyrogenic silica, silicates, silicon hydroxides, silicon oxides, lime, plaster, rubber crumb, polymer powder, and mixtures thereof.

16. The process as claimed in claim 15, wherein the anticaking compound is a fumed silica.

* * * * *